(12) United States Patent
Lee et al.

(10) Patent No.: US 12,037,251 B2
(45) Date of Patent: Jul. 16, 2024

(54) PATTERNING POLYMER-FILLED NANOPARTICLE FILMS VIA LEACHING-ENABLED CAPILLARY RISE INFILTRATION (LeCaRI)

(71) Applicant: The Trustees of the University of Pennsylvania, Philadelphia, PA (US)

(72) Inventors: Daeyeon Lee, Wynnewood, PA (US); R. Bharath Venkatesh, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 83 days.

(21) Appl. No.: 17/223,546

(22) Filed: Apr. 6, 2021

(65) Prior Publication Data

US 2021/0309526 A1 Oct. 7, 2021

Related U.S. Application Data

(60) Provisional application No. 63/005,567, filed on Apr. 6, 2020.

(51) Int. Cl.
| | |
|---|---|
| *B05D 3/00* | (2006.01) |
| *B05D 1/28* | (2006.01) |
| *B05D 5/00* | (2006.01) |
| *C01B 33/149* | (2006.01) |
| *C08J 5/18* | (2006.01) |
| *B82Y 30/00* | (2011.01) |
| *B82Y 40/00* | (2011.01) |

(52) U.S. Cl.
CPC ............ *C01B 33/149* (2013.01); *B05D 1/286* (2013.01); *B05D 3/007* (2013.01); *B05D 5/00* (2013.01); *C08J 5/18* (2013.01); *B05D 2203/00* (2013.01); *B05D 2518/10* (2013.01); *B82Y 30/00* (2013.01); *B82Y 40/00* (2013.01); *C08J 2383/04* (2013.01)

(58) Field of Classification Search
CPC ....................................................... B05D 5/00
See application file for complete search history.

(56) References Cited

U.S. PATENT DOCUMENTS

| | | | | |
|---|---|---|---|---|
| 2003/0203174 A1* | 10/2003 | McCarthy | ............. | H05K 1/034 428/209 |
| 2012/0019914 A1* | 1/2012 | Miguez Garcia | ...... | G02B 1/005 359/584 |

OTHER PUBLICATIONS

"Nanoporous Polymer-Infiltrated Nanoparticle Films with Uniform or Graded Porosity via Undersaturated Capillary Rise Infiltration," Jyo Lyn Hor, Yijie Jiang, David J. Ring, Robert A. Riggleman, Kevin T. Turner, and Daeyeon Lee, ACS Nano, vol. 11, 2017, pp. 3229-3236. (Year: 2017).*

(Continued)

*Primary Examiner* — David P Turocy
*Assistant Examiner* — Mohammad Mayy
(74) *Attorney, Agent, or Firm* — BakerHostetler

(57) ABSTRACT

Provided are methods for forming polymer-infiltrated nanoparticle films by using capillary action to draw mobile molecular chains into the pores of a bed of nanoparticles. The chains can spread across the entire bed of nanoparticles. The disclosed methods also provide the formation of patterned polymer-infiltrated nanoparticle film compositions, as well as laterally graded compositions and compositions that feature a polymer gradient through the composition's thickness. Articles can be formed that include a plurality of polymer types infiltrated into the bed of nanoparticles.

19 Claims, 20 Drawing Sheets
(16 of 20 Drawing Sheet(s) Filed in Color)

(56) References Cited

OTHER PUBLICATIONS

"Rise and side infiltration in opals and porous materials for their skin-free replica synthesis", Ion Sandu, Marius Dumitru, Claudiu Teodor Fleaca and Florian Dumitrache, Mater. Res. Express 6 (2019) 046201 (Year: 2019).*

Akcora et al., "Anisotropic self-assembly of spherical polymer-grafted nanoparticles," Nat. Mater., vol. 8, 2009, pp. 354-359.

Bertei et al., "Effective transport properties in random packings of spheres and agglomerates," Chemical Engineering Transactions, vol. 32, 2013, pp. 1531-1536.

Berthier et al., "Engineers are from PDMS-land, Biologists are from Polystyrenia," Lab Chip, vol. 12, 2012, pp. 1224-1237.

Bockstaller et al., "Optical Properties of Polymer-Based Photonic Nanocomposite Materials," J. Phys. Chem. B., vol. 107, 2003, pp. 10017-10024.

Cao et al., "Capillary filling dynamics of polymer melts in nanopores: experiments and rheological modelling," RSC Adv., vol. 6, 2016, pp. 7553-7559.

Chen et al., "Hydrophilic patterning of superhydrophobic surfaces by atmospheric-pressure plasma jet," Micro & Nano Lett., vol. 10, 2015, pp. 105-108.

Chen et al., "Mechanical Reinforcement of Polymer Nanocomposites from Percolation of a Nanoparticle Network," ACS Macro Lett., vol. 4, 2015, pp. 398-402.

Chen et al., "Vertically-aligned carbon nanotubes infiltrated with temperature-responsive polymers: smart nanocomposite films for self-cleaning and controlled release," Chem. Comm., vol. 2, 2008, pp. 163-165.

Cheng et al., "Dispersing Nanoparticles in a Polymer Film via Solvent Evaporation," ACS Macro Lett., vol. 5, 2016, pp. 694-698.

Coakley et al., "Infiltrating Semiconducting Polymers into Self-Assembled Mesoporous Titania Films for Photovoltaic Applications," Adv. Funct. Mater., vol. 13, 2003, pp. 301-306.

Deutsch et al., "Conjugated-Polymer Photonic Crystals," Adv. Mater., vol. 12, 2000, pp. 1176-1180.

Flory et al., "Optical properties of nanostructured materials: a review," J. Nanophotonics, vol. 5, 2011, 052502.

Gao et al., "Exploitation of multiple incidences spectrometric measurements for thin film reverse engineering," Optics express, vol. 20, No. 14, 2012, pp. 15734-15751.

Geissler et al., "Patterning: Principles and Some New Developments," Adv. Mater., vol. 16, 2004, pp. 1249-1269.

Gemici et al., "Targeted functionalization of nanoparticle thin films via capillary condensation," Nano Lett., vol. 9, 2009, pp. 1064-1070.

Hale et al., "Optical constants of water in the 200-nm to 200-um wavelength region," Applied optics, vol. 12, No. 3, 1973, pp. 555-563.

Hampton et al., "The Patterning of Sub-500 nm Inorganic Oxide Structures," Adv. Mater., vol. 20, 2008, pp. 2667-2673.

Hor et al., "Nanoporous Polymer-Infiltrated Nanoparticle Films with Uniform or Graded Porosity via Undersaturated Capillary Rise Infiltration," ACS Nano, vol. 11, 2017, pp. 3229-3236.

Hourlier-Fargette et al., "Extraction of Silicone Uncrosslinked Chains at Air-Water-Polydimethylsiloxane Triple Lines," Langmuir, vol. 34, 2018, pp. 12244-12250.

Huang et al., "Polymer nanocomposite films with extremely high nanoparticle loadings via capillary rise infiltration (CaRI)," Nanoscale, vol. 7, 2015, pp. 798-805.

Hwang et al., "Direct nanoprinting by liquid-bridge-mediated nanotransfer moulding," Nat. Nanotechnol., vol. 5, 2010, 742-748.

J. A. Woollam Co., Inc. CompleteEASE Data Analysis Manual.

Jiang et al., "Toughening Nanoparticle Films via Polymer Infiltration and Confinement," ACS Appl. Mater. Interfaces, vol. 10, 2018, pp. 44011-44017.

John et al., "Large-area, continuous roll-to-roll nanoimprinting with PFPE composite molds," Nanotechnology, vol. 24, 2013, 505307.

Johnston et al., "Mechanical characterization of bulk Sylgard 184 for microfluidics and microengineering," Journal of Micromechanics and Microengineering vol. 24, No. 3, 2014, 035017.

Jongh et al., "Melt infiltration: an emerging technique for the preparation of novel functional nanostructured materials," Adv. Mater., vol. 25, 2013, pp. 6672-6690.

Kim et al., "Epitaxial self-assembly of block copolymers on lithographically defined nanopatterned substrates," Nature, vol. 424, 2003, pp. 411-414.

Kim et al., "Fabrication of a Hydrophilic Line on a Hydrophobic Surface by Laser Ablation Processing," Micromachines, vol. 9, 2018, 208.

Kim et al., "Nanopatterning of photonic crystals with a photocurable silica-titania organic-inorganic hybrid material by a UV-based nanoimprint technique," J. Mater. Chem., vol. 15, 2005, pp. 4535-4539.

Kim et al., "Polymer microstructures formed by moulding in capillaries," Nature, vol. 376, 1995, pp. 581-584.

Ko et al., "Direct nanoimprinting of metal nanoparticles for nanoscale electronics fabrication," Nano Lett., vol. 7, 2007, pp. 1869-1877.

Kothari et al., "Direct Patterning of Robust One-Dimensional, Two-Dimensional, and Three-Dimensional Crystalline Metal Oxide Nanostructures Using Imprint Lithography and Nanoparticle Dispersion Inks," Chem. Mater., vol. 29, 2017, pp. 3908-3918.

Kuang et al., "Inkjet Printing Patterned Photonic Crystal Domes for Wide Viewing-Angle Displays by Controlling the Sliding Three Phase Contact Line," Adv. Opt. Mater., vol. 2, 2014, pp. 34-38.

Kumar et al., "Nanocomposites with Polymer Grafted Nanoparticles," Macromolecules, vol. 46, 2013, pp. 3199-31214.

Lee et al., "Solvent compatibility of poly(dimethylsiloxane)-based microfluidic devices," Anal. Chem., vol. 75, 2003, pp. 6544-6554.

Li et al., "Direct Imprinting of Scalable, High-Performance Woodpile Electrodes for Three-Dimensional Lithium-Ion Nanobatteries," ACS Appl. Mater. Interfaces, vol. 10, 2018, pp. 5447-5454.

Li et al., "Large area direct nanoimprinting of SiO2—TiO2 gel gratings for optical applications," J. Vac. Sci. Tech. B., vol. 21, 2003, pp. 660-663.

Li et al., "Porous-Silicon/Polymer Nanocomposite Photonic Crystals Formed by Microdroplet Patterning," Adv. Mater., vol. 17, 2005, pp. 1249-1251.

Liff et al., "High-performance elastomeric nanocomposites via solvent-exchange processing," Nat. Mater., vol. 6, 2007, pp. 76-83.

Liu et al., "Capillary Force Lithography Pattern-Directed Self-Assembly (CFL-PDSA) of Phase-Separating Polymer Blend Thin Films," ACS Omega, vol. 3, 2018, pp. 2161-2168.

MacKay et al., "General strategies for nanoparticle dispersion," Science, vol. 311, 2006, pp. 1740-1743.

Manohar et al., "Solvent-Driven Infiltration of Polymer (SIP) into Nanoparticle Packings," ACS Macro Lett., vol. 6, 2017, pp. 1104-1108.

Mata et al., "Characterization of polydimethylsiloxane (PDMS) properties for biomedical micro/nanosystems," Biomedical microdevices, vol. 7, 2005, pp. 281-293.

Merkel et al., "Ultrapermeable, reverse-selective nanocomposite membranes," Science, vol. 296, 2002, pp. 519-522.

Millet et al., "Less is More: Oligomer extraction and hydrothermal annealing increase PDMS bonding forces for new microfluidics assembly and for biological studies," 2017, bioRxiv 150953; doi: https://doi.org/10.1101/150953.

Munch et al., "Tough, bio-inspired hybrid materials," Science, vol. 322, 2008, pp. 1516-1520.

Nagarajan et al., "Dual-Tone Patterned Mesoporous Silicate Films Templated From Chemically Amplified Block Copolymers," Adv. Funct. Mater., vol. 19, 2009, pp. 2728-2734.

Paul et al., "Patterning Spherical Surfaces at the Two-Hundred-Nanometer Scale Using Soft Lithography," Adv. Funct. Mater., vol. 13, 2003, pp. 259-263.

Qiang et al., "Polymer blend-filled nanoparticle films via monomer-driven infiltration of polymer and photopolymerization," Molecular Systems Design & Engineering, vol. 3, 2018, pp. 96-102.

Regehr et al., "Biological implications of polydimethylsiloxane-based microfluidic cell culture," Lab Chip, vol. 9, 2009, pp. 2132-2139.

(56) References Cited

OTHER PUBLICATIONS

Rémond et al., "Characterization of voids in spherical particle systems by Delaunay empty spheres," Granular Matter, vol. 10, 2008, pp. 329-334.

Ruiz et al., "Microcontact printing: A tool to pattern," Soft Matter, vol. 3, 2007, pp. 168-177.

Sen et al., "Molecular Underpinnings of the Mechanical Reinforcement in Polymer Nanocomposites," Macromolecules, vol. 40, 2007, pp. 4059-4067.

Shiflett et al., "Ultrasonic deposition of high-selectivity nanoporous carbon membranes," Science, vol. 285, 1999, pp. 1902-1905.

Song et al., "Block Copolymer Nanocomposites with High Refractive Index Contrast for One-Step Photonics," ACS Nano, vol. 10, 2016, pp. 1216-1223.

Sylgard 184 Technical Data Sheet, The Dow Chemical Company. Form No. 11-3184-01 C (2017).

Ueda and PA Levkin, in Non-wettable surfaces: theory, preparation and applications, ed. RHA Ras, A Marmur, Royal Society of Chemistry, Cambridge, 2017, Chapter 7, 182-222.

Vorobyev et al., "Multifunctional surfaces produced by femtosecond laser pulses," J. Appl. Phys., vol. 117, 2015, 033103.

Wegst et al., "Bioinspired structural materials," Nat. Mater., vol. 14, 2015, pp. 23-36.

Xia et al., "Soft Lithography," Angew. Chem. Int. Ed. Engl., vol. 37, 1998, pp. 550-575.

Xing et al., "Integrative Bioinspired Surface with Wettable Patterns and Gradient for Enhancement of Fog Collection," ACS Appl. Mater. Interfaces, vol. 11, 2019, pp. 10951-10958.

Yang et al., "Hierarchically ordered oxides," Science, vol. 282, 1998, pp. 2244-2246.

Yao et al., "Photoinduced disorder in strongly segregated block copolymer composite films for hierarchical pattern formation," ACS Nano, vol. 7, 2013, pp. 1513-1523.

Yunus et al., "Diffusion of oligomers from polydimethylsiloxane stamps in microcontact printing: Surface analysis and possible application," Surf. Interface Anal., vol. 39, 2007, pp. 922-925.

Zhang et al., "A new approach to hybrid nanocomposite materials with periodic structures," J. Am. Chem. Soc., vol. 124, 2002, pp. 14512-14513.

Zhang et al., "Wetting Transition in Cylindrical Alumina Nanopores with Polymer Melts," Nano Lett., vol. 6, 2006, pp. 1075-1079.

Zhao et al., "Following or Against Topographic Wettability Gradient: Movements of Droplets on a Micropatterned Surface," Langmuir, vol. 33, 2017, pp. 5328-5335.

\* cited by examiner

Fig. 9
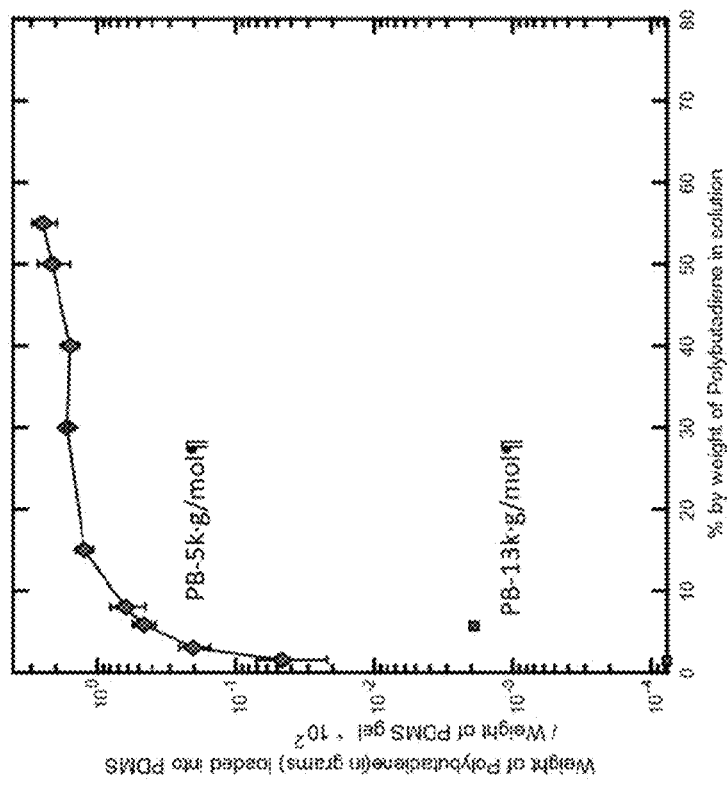
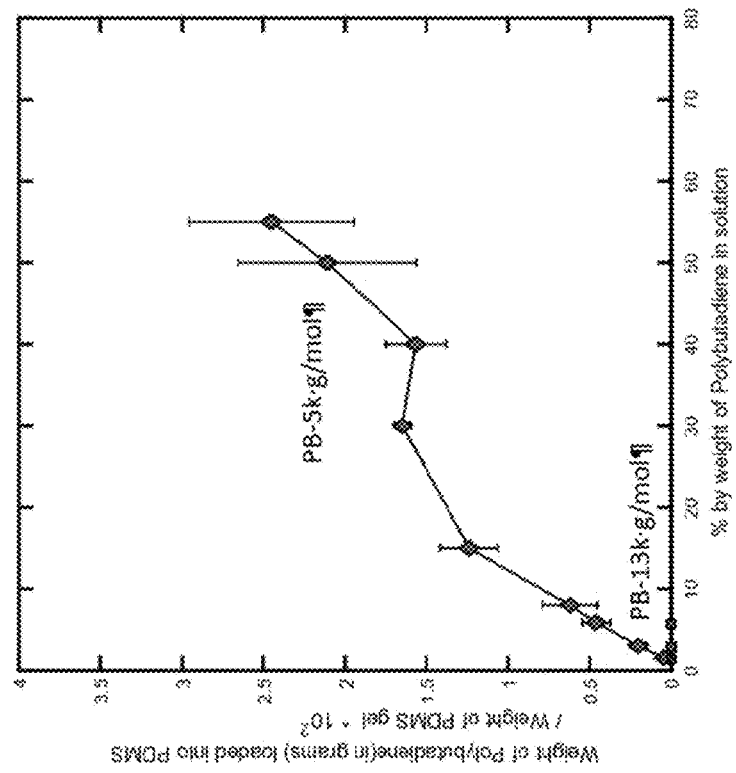

PATTERNING POLYMER-FILLED NANOPARTICLE FILMS VIA LEACHING-ENABLED CAPILLARY RISE INFILTRATION (LeCaRI)

RELATED APPLICATIONS

The present application claims priority to and the benefit of U.S. patent application No. 63/005,567, "Patterning Polymer-Filled Nanoparticle Films Via Leaching-Enabled Capillary Rise Infiltration (LeCaR1)" (filed Apr. 6, 2020), the entirety of which application is incorporated herein by reference for any and all purposes.

GOVERNMENT RIGHTS

This invention was made with government support under DMR1720530 awarded by the National Science Foundation. The government has certain rights in the invention.

TECHNICAL FIELD

The present disclosure relates to the field of polymer-nanoparticle composite materials.

BACKGROUND

Polymer-infiltrated (PINFs) represent a unique class of nanocomposites made of polymers and nanoscale materials. Existing approaches of making such films, however, can require specialized equipment, reagents, and conditions and are not always efficient to perform. Accordingly, there is a long-felt need in the art for improved methods of fabricating PINFs as well as of methods of patterning such films.

SUMMARY

In meeting these long-felt needs, the present disclosure provides methods, comprising: contacting a bed of nanoparticles and a surface of a polymer source, the polymer source comprising a plurality of free polymer chains, the contacting being performed under conditions such that at least some of the plurality of free polymer chains infiltrate by capillary action into interstitial spaces within the bed of nanoparticles. The disclosed methods also include techniques for patterning PINFs.

Also provided are polymer-infiltrated nanoparticle films, comprising: a bed of nanoparticles; and a polymer infiltrated into interstitial spaces within the bed of nanoparticles, the polymer-infiltrated nanoparticle film comprising from about 50 vol % to about 99 vol % nanoparticles. The disclosed technology also provides patterned PINFs, including PINFs that include a polymer gradient in a lateral direction along the PINFs, as well as PINFs that include a polymer gradient in the direction of the thickness of the PINF.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

(FIG. 3A) Schematic illustration showing patterning PINF via LeCaRI. (FIG. 3B) Patterned Films on silicon wafer (films with the logo of the University of Pennsylvania and UPENN imprints have been reversed for clarity), (FIG. 3C) and (FIG. 3D) optical micrographs of patterned PINF films at different magnifications.

(FIG. 4C) Average grayscale Intensity measured in the red rectangular region in a) normalized by the total intensity. UV-PDMS oligomer-infiltrated film (FIG. 4D) soon after patterning and (FIG. 4E) 3 hours after pattern preparation without UV irradiation. (FIG. 4F) Intensity change observed within the area noted with a red rectangle in (FIG. 4D). UV-PDMS oligomers infiltrated films (FIG. 4G) soon after patterning and (FIG. 4H) 3 hours after patterning with UV irradiation. (FIG. 4I) Intensity change observed within the area noted with a red rectangle in (FIG. 4G).

FIG. 9: Loading of commercially available Polybutadiene of two different molecular weights (average $MW_n$ =4878 g/mol, PDI=1.667 and $MW_n$ =13312 g/mol, PDI=1.082) into depleted gels using solutions of different concentration in toluene for loading time of 24 hours were performed. The amount loaded is characterized by weight change in the PDMS and then reported as net weight change/original weight of PDMS.

DETAILED DESCRIPTION OF ILLUSTRATIVE EMBODIMENTS

Figure 1:
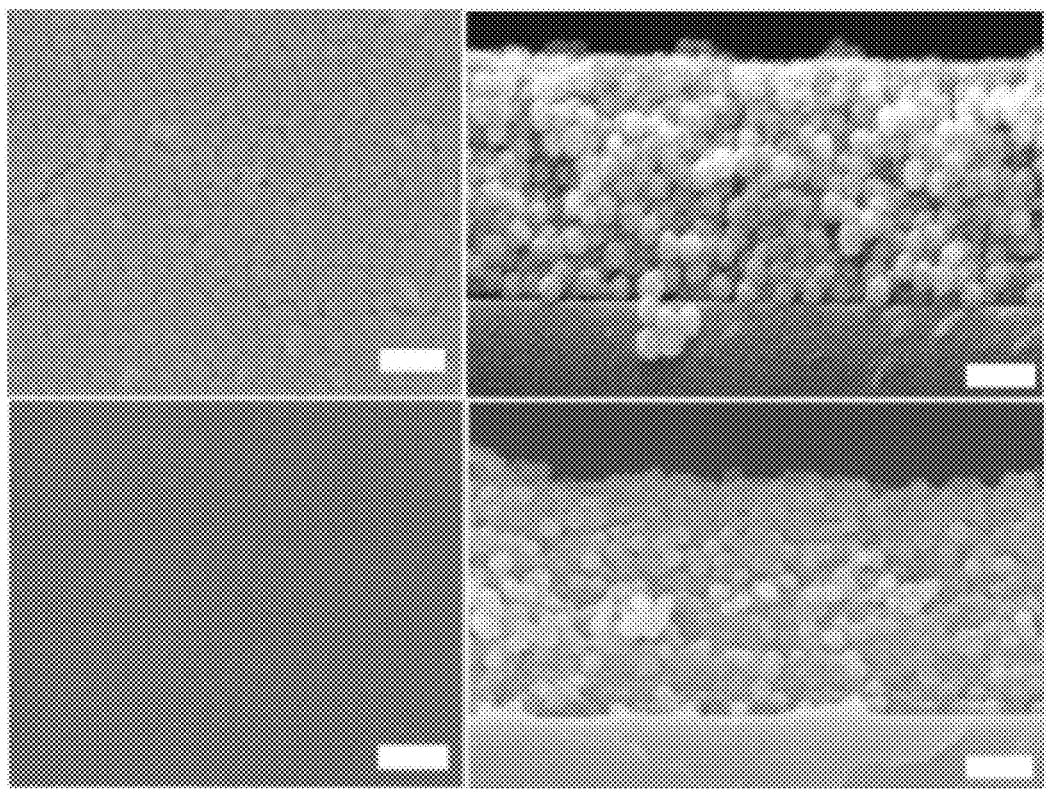
FIG. 1: SEM images of the top-down (left) and cross-section (right) of exemplary NP packings before (top) and after (bottom) LeCaRI. All the scale bars represent 100 nm.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Conceptual Overview

Capillarity is a powerful force at the nanoscale. Taking advantage of this force, provided here is a rapid and versatile process to make patterned nanocomposite films. Leaching-enabled capillary rise infiltration (LeCaRI) is a powerful method to generate composites by inducing leaching and subsequent infiltration of uncross-linked chains from an elastomer network into the pores of a nanoparticle packing at room temperature without use of any solvents. This method offers a unique and rapid capability to create both non-permanent and permanent patterned microdomains of composites.

Unlike conventional methods of patterning composites, the disclosed methods can be performed at room temperature without the need for sophisticated equipment and solvents. The disclosed technology can also produce nanocomposite patterns with extremely high fill fractions. Laterally- and vertically-graded patterns and features can be fabricated to produce surface structures with laterally- and vertically-graded optical, mechanical and wetting properties. This method is an environmentally friendly scalable method to manufacture polymer infiltrated nanoparticle films for, e.g., applications in water collection and optical grating.

The high volume fraction, typically above 50 vol %, of nanoparticles (NPs) present in PINFs imparts strength and toughness to these composites, making them ideal for protective coatings applications. High volume fractions of NP also make PINFs useful for fabricating photonic structure and gas barrier coatings, as but some examples.

Inducing polymer imbibition into the voids of NP packings is a strategy to produce polymer-infiltrated NP films (PINFs) with high loadings of NP (>60 vol %). The disclosed method circumvents challenges associated with conventional methods of nanocomposite fabrication in which NPs are directly dispersed into a polymer matrix via blending or compounding.

Patterning of composite structures like PINFs expands the application of these useful nanocomposite films. For example, wave-like patterns can be used as optical gratings. Self-assembly of colloids and block-copolymers can be used to make laterally patterned structures for use as microsensors and diffractive optical elements. Laterally imprinted NP films also can generate a wetting gradient used to divert water from hydrophillic into hydrophobic regions.

Conventional methods available to enable patterning of nanocomposites include ink-jet printing, liquid bridge-enabled nanotransfer, nanoimprinting and nanolithography. Progress in nanoimprinting technologies, in particular, has led to a variety of methods to generate and replicate patterned composite films with feature size ranging from microns to nanoscale. These methods, however, are costly, involve multiple steps, require access to cleanroom facilities or supercritical fluid processes, and are severely limited in the fabrication of patterns of nanocomposite structures with extremely high volume fractions (>60 vol %) of NPs.

Here is provided a simple, room temperature, solvent-free and rapid method of patterning PINFs using leaching-enabled CaRI ("LeCaRI"). One can take advantage of capillarity at the nanoscale along with the presence of mobile chains in an elastomer network.

It should be understood that although PDMS elastomer is used to illustrate the disclosed technology, the present technology is not limited to PDMS, to elastomers in general, or to any other particular material or species. The disclosed technology can be used with virtually any nanoparticle and also with virtually any curable (e.g., polymerizable, cross-linkable) monomer or oligomer.

When an elastomer network is formed by inducing cross-linking between oligomer chains (e.g., low molecular weight oligomers) or monomer chains, some of these chains do not fully become incorporated into the network and remain within the network as mobile species. When this elastomer is brought into contact with a nanoparticle packing, capillarity leaches these mobile chains from the elastomer network and into the voids of the packing to form a PINE. Patterns of highly filled nanocomposite can thus be prepared by using soft lithography techniques. Given the simplicity of the method, LeCaRI is a powerful and potentially scalable strategy to pattern PINFs prepared with various polymers and NPs for fabrication of designer surfaces with patterned optical, wetting and mechanical properties.

Exemplary Results

To illustrate LeCaRI, one can use a commonly used elastomer made of poly(dimethylsiloxane) (PDMS). One form of PDMS elastomer, SYLGARD™ 184, is made of vinyl terminated PDMS chains. By inducing crosslinking between the PDMS chains, a monolithic PDMS elastomer can be prepared. During curing of PDMS elastomer, not all oligomers in the mixture get incorporated into the network. Instead, in a single piece of PDMS elastomer, a number of un-crosslinked PDMS oligomeric chains are present. These un-crosslinked chains can be removed using different methods.

Figure 5:
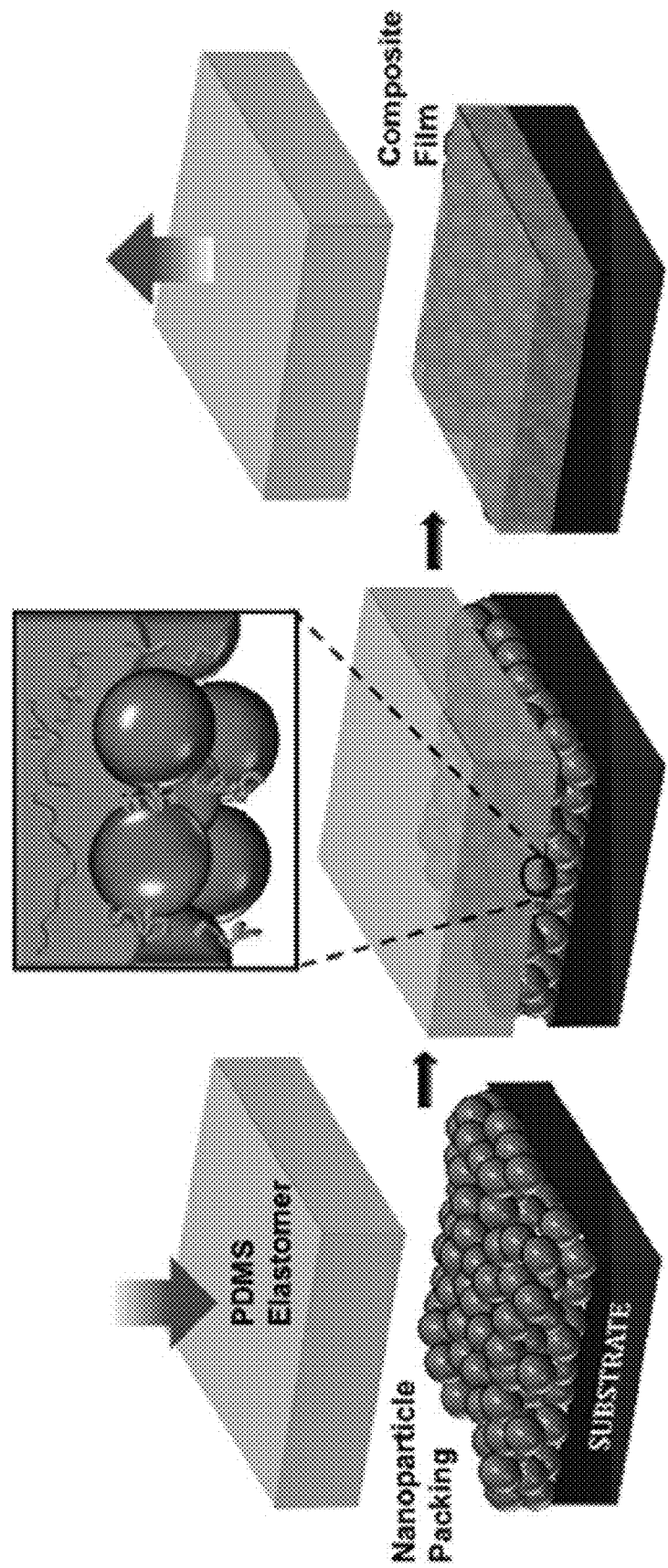
FIG. 5: Schematic illustration showing the LeCaRI process. A disordered NP packing spin coated on top of a substrate is brought into conformal contact with a PDMS elastomer. Inset shows un-crosslinked (also termed uncrosslinked or non-crosslinked) chains leaching out of the elastomer into the pores of the NP packing. A composite film is obtained on the substrate when the elastomer is removed.

Although the presence of these uncrosslinked oligomers is often regarded as an undesirable nuisance, one can in fact take advantage of the fact that these oligomers have high mobility and that they can be leached out of the network. The presence of un-crosslinked chains in the PDMS elastomer and their ability to leach out make PDMS reservoir of oligomers that can be infiltrated into a NP packing by LeCaRI, as illustrated in FIG. 5.

LeCaRI was demonstrated by inducing infiltration of oligomeric PDMS into films of randomly packed silica ($SiO_2$) NPs. A 250-nm thick film of 27-nm $SiO_2$ NP was prepared using spin coating. A slab of PDMS ($1 \times 1 \times 0.5$ $cm^3$) was then brought into contact with the top of the nanoparticle (NP) film and held in place for 5-10 seconds as shown in FIG. 1. The PDMS was then detached from the NP film slowly.

The refractive index of the NP film, as measured by ellipsometry, increases indicating the infiltration of oligomeric species into the voids of the NP packing. Oligomer infiltration was further confirmed by scanning electron microscopy (SEM) of the NP film before and after LeCaRI.

The voids of the NP packing appear dense and filled after LeCaRI as shown in FIG. 1. The void spaces between the spherical NP have been filled with a darker material in the top surface, and the cross-sectional SEM micrograph shows that the NP were covered with a thin liquid like film made of the infiltrated PDMS oligomers. There was no change in the thickness of the packing after infiltration, indicating that the volume fraction of the packing remains constant above 60 vol %.

To confirm whether it was in fact oligomeric PDMS chains that have infiltrated the $SiO_2$ NP film, one can remove the un-crosslinked chains from PDMS elastomer before LeCaRI by soaking freshly cured PDMS in a suitable solvent (e.g., toluene) for a time. The PDMS elastomer shrinks due to the loss of the oligomers and loses its weight by 4.5 wt %. The elastomer is subsequently soaked in ethanol for a day to make it more flexible. When such a PDMS elastomer is then brought into conformal contact with a $SiO_2$ NP film, there was no change in the refractive index of the NP film, which indicates that LeCaRI has not taken place.

Monitoring the kinetics of the infiltration process shows that the LeCaRI process can be fast. Complete infiltration can achieved within 5-10 seconds of establishing contact between the NP film and the PDMS elastomer. If the time of infiltration is estimated based on the Lucas-Washburn model, it can take less than 1 sec for complete infiltration to occur.

Without being bound to any particular theory, two factors may control the extent of oligomer infiltration (i.e., volume fraction of oligomers): NP size and relative humidity. The capillary pressure that induces LeCaRI is inversely proportional to the NP size. Water vapor undergoes capillary condensation in these NP packings, and this water exists in the narrow necks between adjoining NPs forming liquid bridges. The high curvature of the liquid/vapor interface of the liquid bridge between NPs leads to a depressed vapor pressure of the condensate liquid. Increased relative humidity results in greater amount of capillary condensed water.

Figure 2:
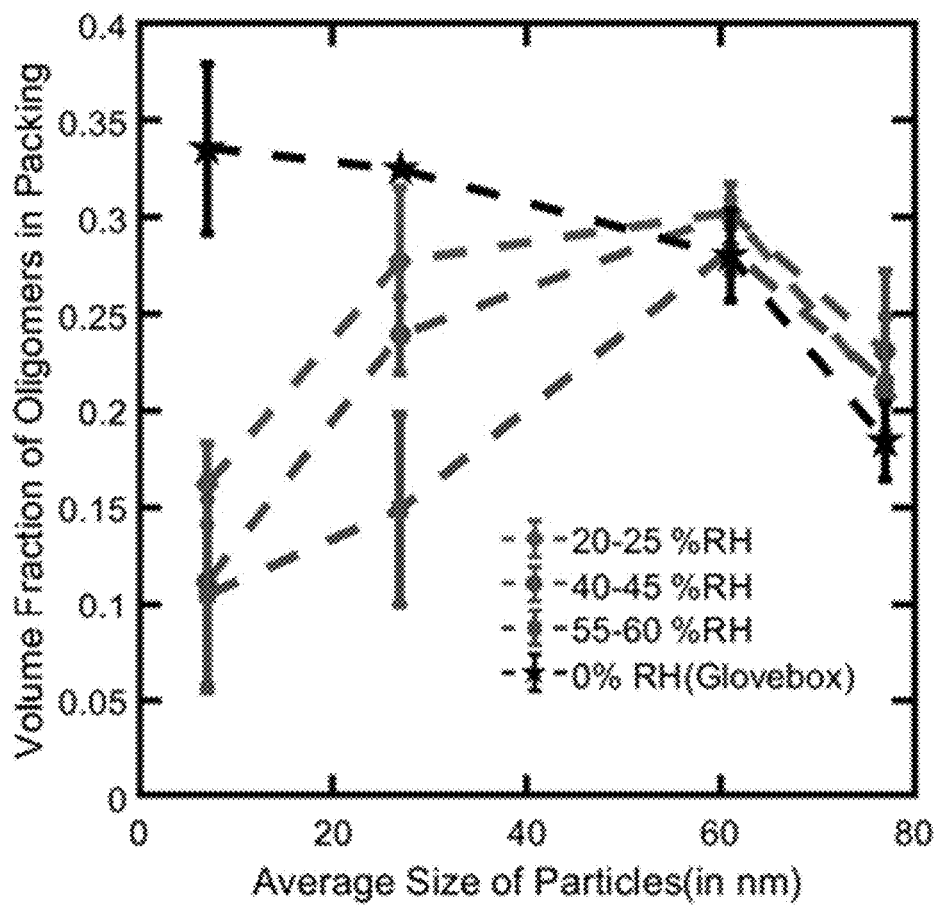
FIG. 2: Volume fraction of oligomers in the packings of different NP sizes at three humidity levels.

To study the effects of NP size and relative humidity on the extent of LeCaRI, $SiO_2$ NPs of various average sizes ranging from 7 to 77 nm were used to prepare NP films, which were subsequently exposed to three different levels of relative humidity: 20-25 RH % under ambient conditions, and 40-45 RH % and 55-60 RH % in a humidity-controlled chamber. PDMS elastomer was brought into conformal contact with each NP film and left in contact for 5-10 seconds. Comparing the change in the refractive index values before and after LeCaRI enables calculation of the volume of oligomers in the packing as summarized in FIG. 2.

Again without being bound to any particular theory, two general trends were observed. For a constant particle size, the amount of oligomers inside the packing decreases with the increase in the humidity level likely due to a greater amount of capillary condensed water in the packing. This decrease is evident in the NP packings with small $SiO_2$ NPs (7 nm and 27 nm) in which the amount of capillary-condensed water is higher compared to that in the packings with larger $SiO_2$ NPs (i.e., 61 nm and 77 nm). Increasing humidity therefore decreases the void volume available for infiltration and decreases the oligomer fraction in the packing.

For a given relative humidity, one can observe a maximum in the extent of oligomer infiltration at the particle size of 61 nm (in one example experiment). This non-monotonic dependence can be explained by considering the two opposing factors: the driving force for LeCaRI and the tendency of water vapor to undergo capillary condensation. The NP size primarily controls the driving force of LeCaRI (~1/r, where r is the size of NP). The capillary force that drives LeCaRI is strong in the small sized NP packings where the void sizes are proportionately smaller. Thus, in the absence of capillary condensed water, the packing with the smallest particle size would induce the largest extent of LeCaRI.

For a value of RH that is greater than 0%, however, the particle size determines the amount of capillary condensed water that reside within the packing before LeCaRI takes place. At room temperature and humidity (18-22° C. and 20-25% RH in our experiments), for example, packings of 7 nm and 27 nm diameter NP have 15% and 10%, respectively, of their void volume filled with water due to capillary condensation. Smaller NPs induce higher degree of water vapor condensation. This trend means that the larger particle packings have more void volume available for infiltration than the smaller particle packings. Therefore, these two factors—driving force for LeCaRI and the amount of capillary-condensed water—show opposing trends with particle size at a constant humidity value. Again without being bound to any particular theory, this this trade-off leads to a maximum in the oligomer content at an intermediate particle size of 61 nm, in one experiment. In the case of 7 nm packing, the driving force is high but the pores are occupied heavily by capillary condensed water, whereas in the 77 nm packing, there is more void volume available for the infiltration of oligomers but the driving force for LeCaRI is weak. These results demonstrate that the amount of oligomers infiltrated in the $SiO_2$ NP films can be varied by adjusting the relative humidity and NP size at room temperature.

Also without being bound to any particular theory, the black curve in the figure represents that the oligomer fraction loaded is highest for 0% RH (inside glovebox) in packings made with smaller nanoparticles as compared to ambient humidity (>20% RH). The downward trend of the black line with increase in NP size can signify the role of capillarity in inducing infiltration of the oligomers since an increase in NP size leads to decrease in the amount of oligomers infiltrated because of weaker capillary forces.

As described, LeCaRI is a rapid, simple, and potentially scalable route to the manufacturing of PINFs. One advantage of using PDMS elastomer is that the PDMS can be patterned to have micron-sized surface features. Soft lithography has been widely used to enable microcontact printing and patterning on planar surfaces. One can take advantage of this versatility of PDMS to induce localized LeCaRI to produce patterned PINFs; other elastomers and polymers can also of course be used.

Figure 3A:
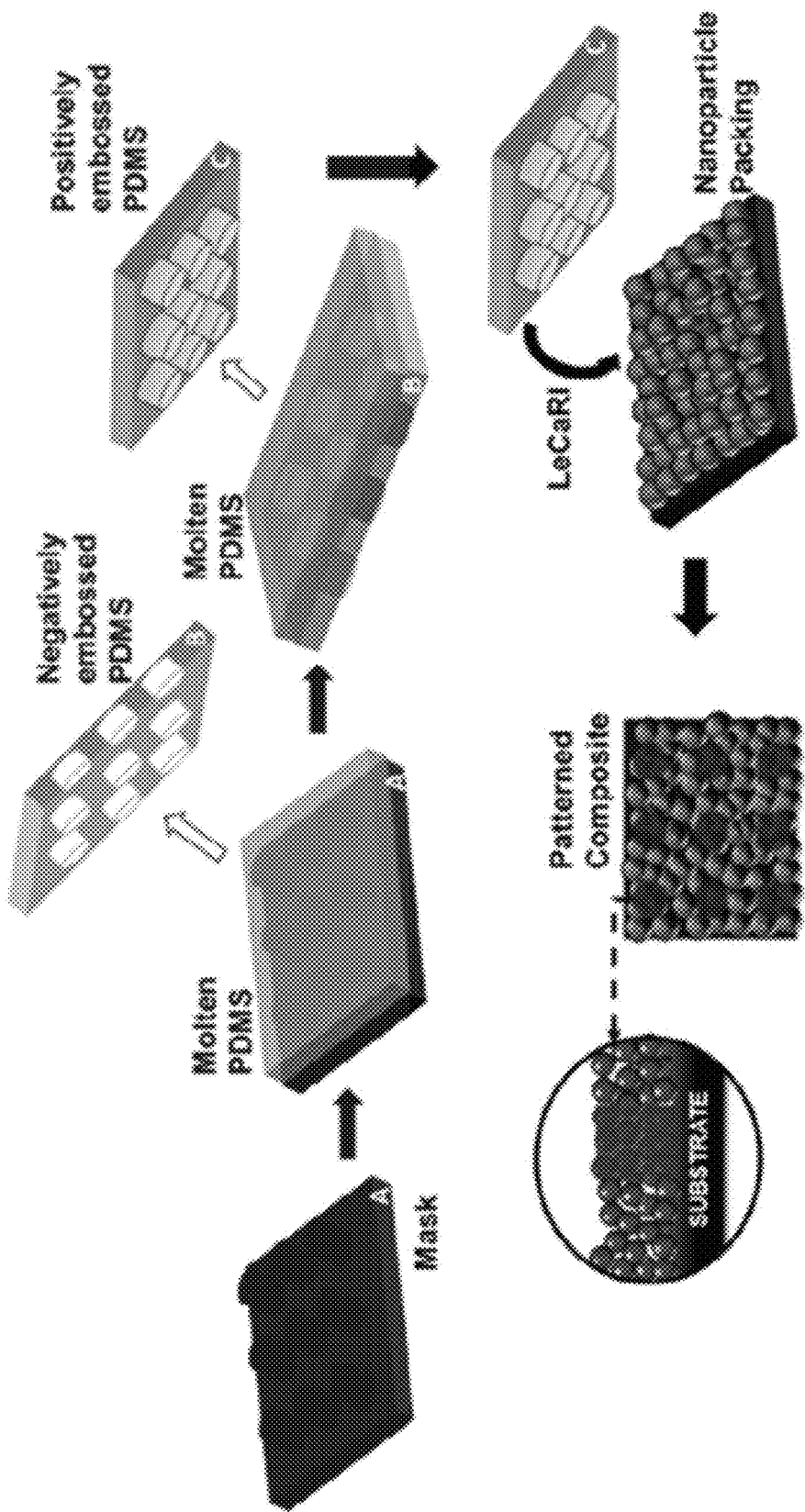
FIGS. 3A-3D.
Figure 3B:
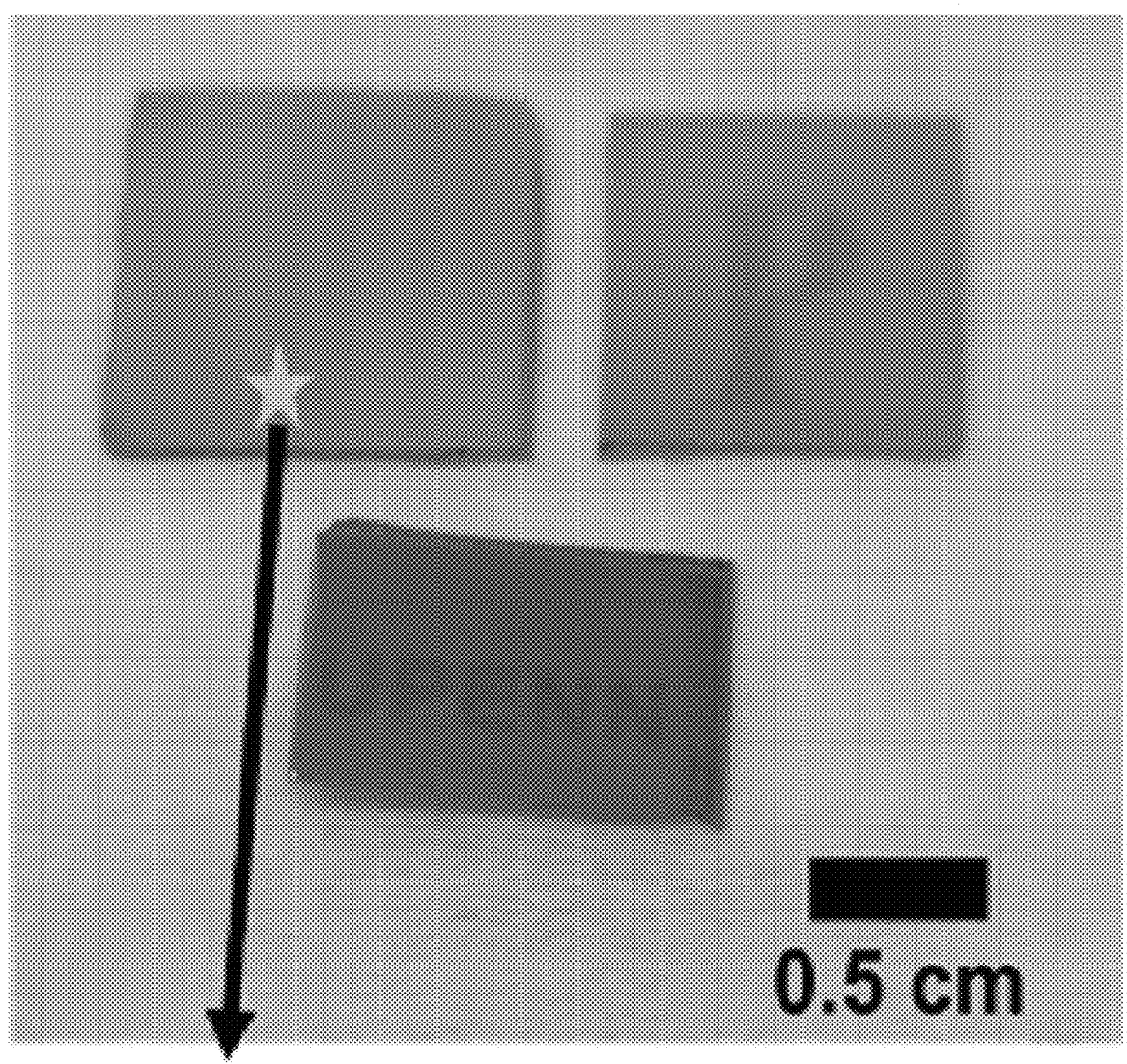
Figure 3C:
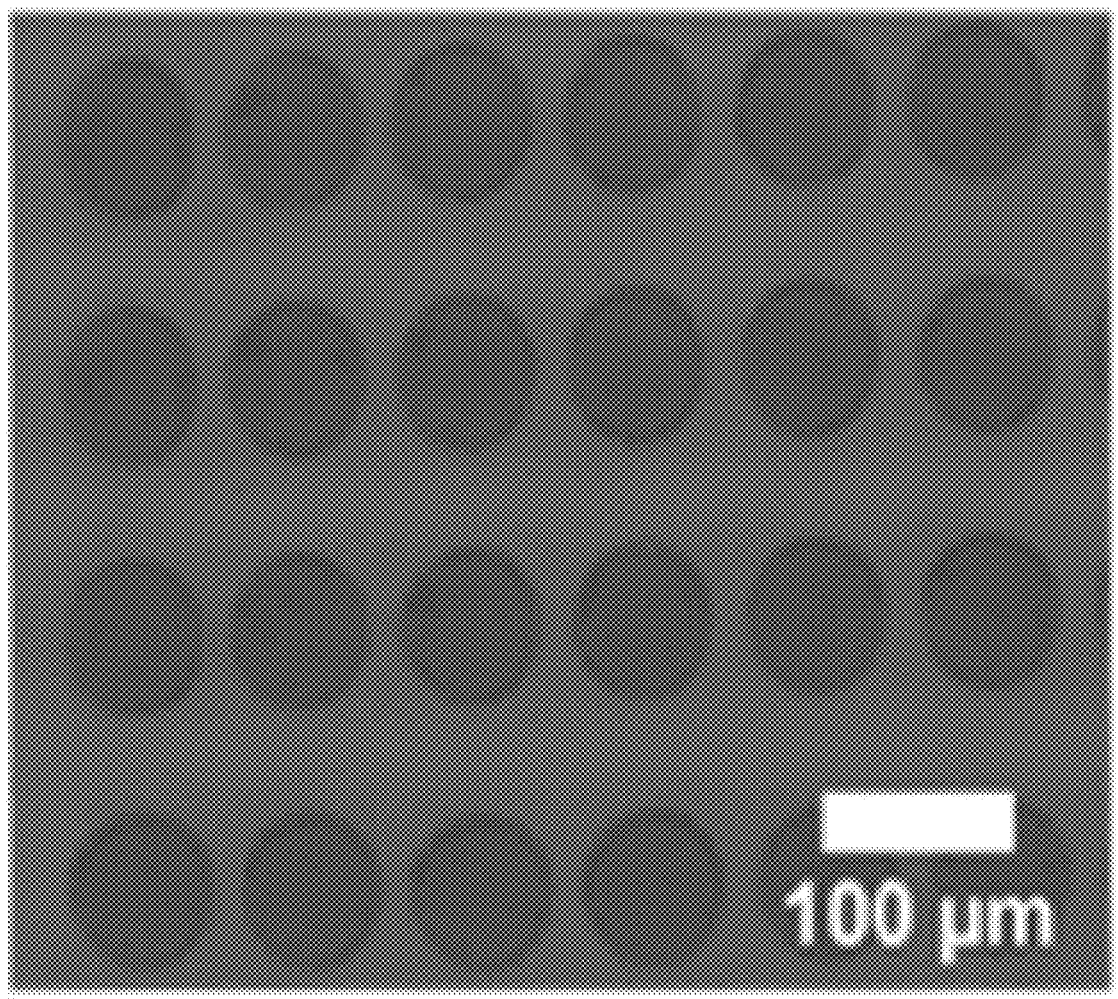
Figure 3D:
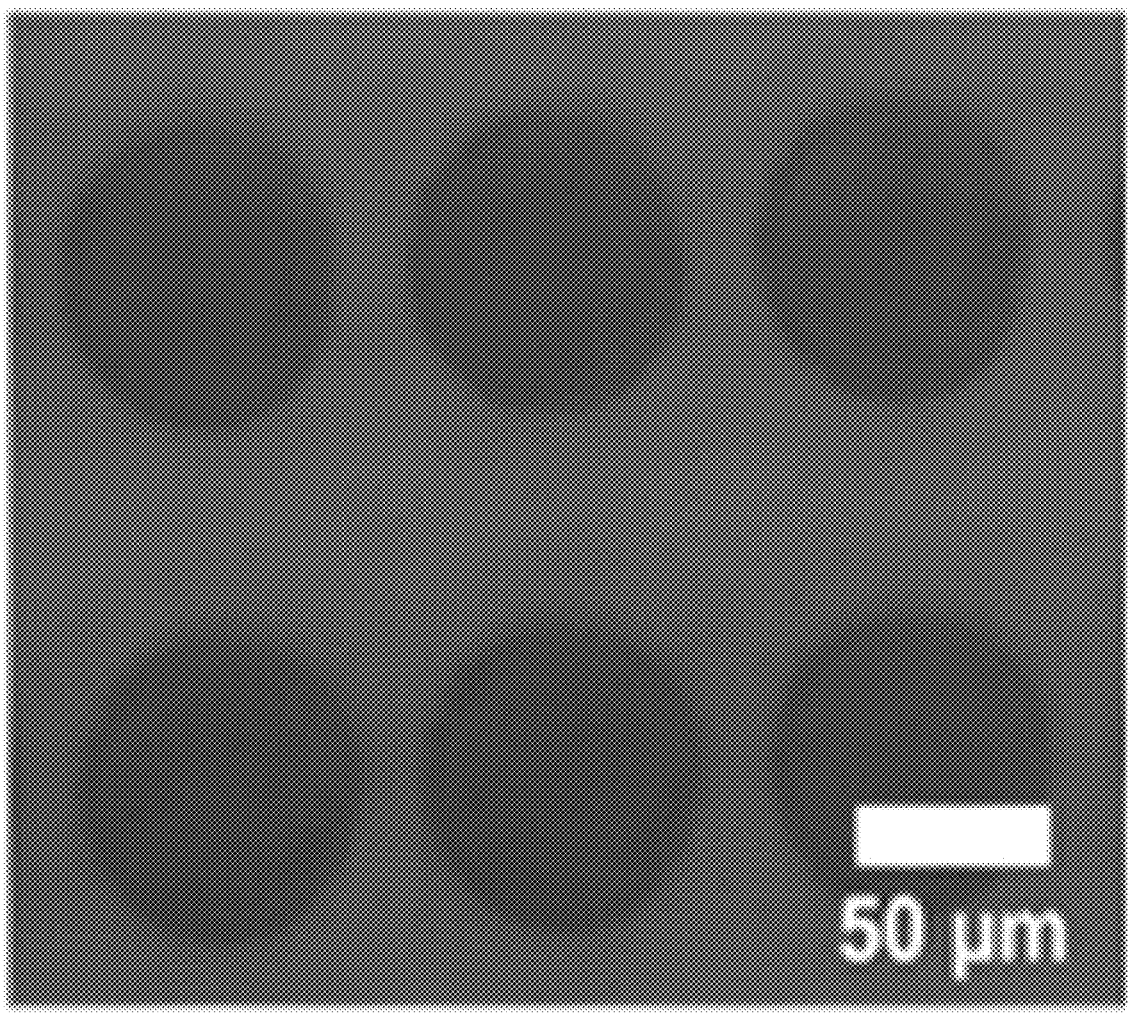

In a further example, a patterned PDMS stamp was prepared using the common soft lithography technique. PDMS precursor was poured onto a hard master that has surface features. PDMS was subsequently cured and peeled from the master and used as a stamp, as illustrated in FIG. 3A. A PDMS stamp with cylindrical pillars of 60 μm radius and 100 μm height with 30 μm inter-pillar distance was used to induce infiltration into circular regions in 27 nm-$SiO_2$ NP films with a thickness of 250 nm. Patterned regions can be clearly observed to the naked eye due to the difference in the refractive indices of the infiltrated and neat NP packings (FIG. 3B). The feature size imprinted on the NP films are comparable to the size of the patterns on the PDMS elastomers as seen in FIGS. 3C-3D.

Figure 4A:
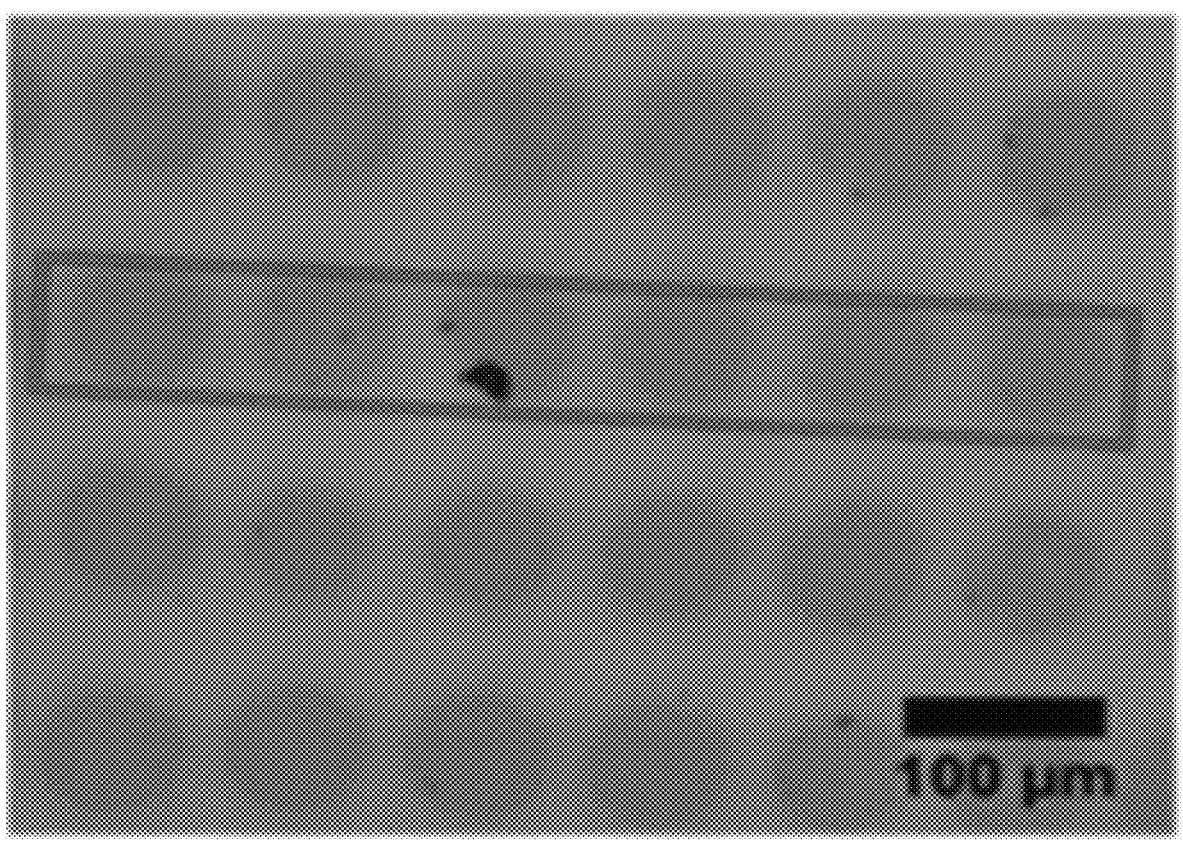
FIGS. 4A-4I: Patterns observed using an optical microscope (FIG. 4A) soon after LeCaRI, and (FIG. 4B) one month after pattern preparation.
Figure 4B:
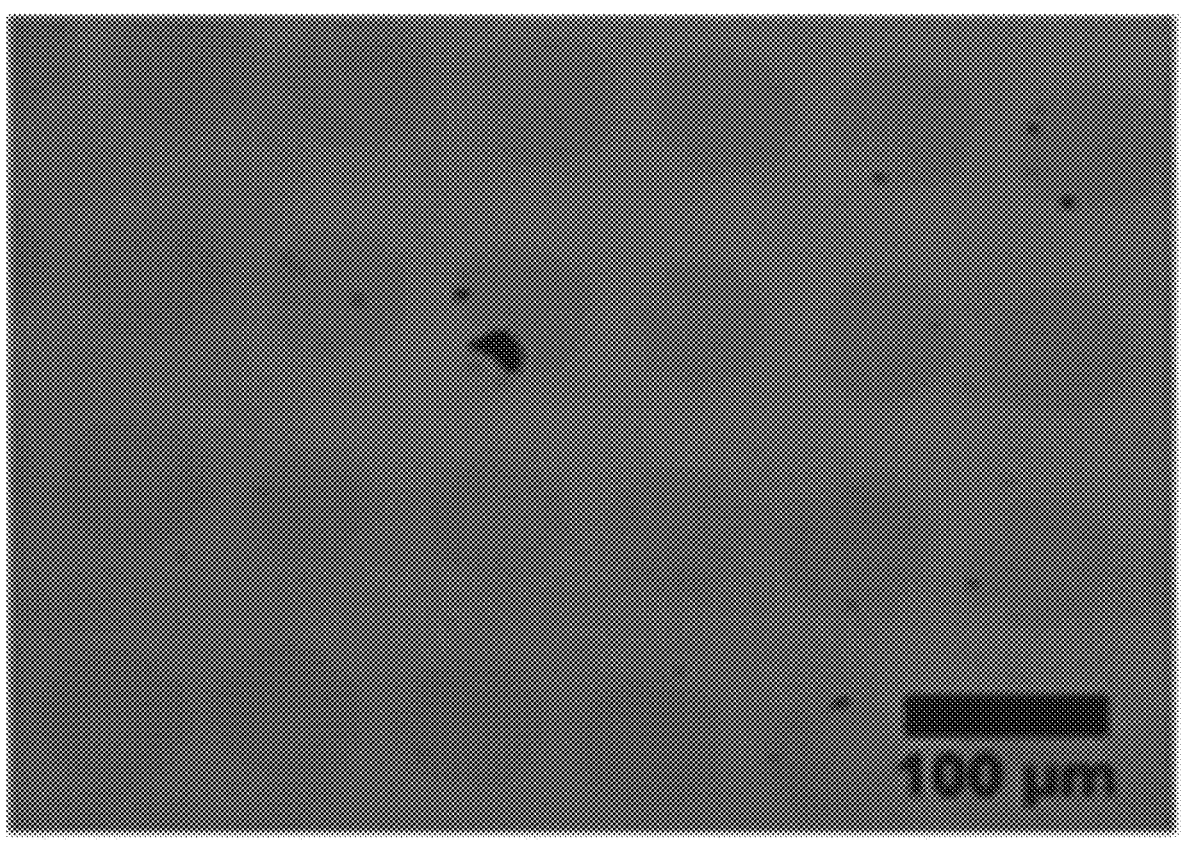
Figure 4C:
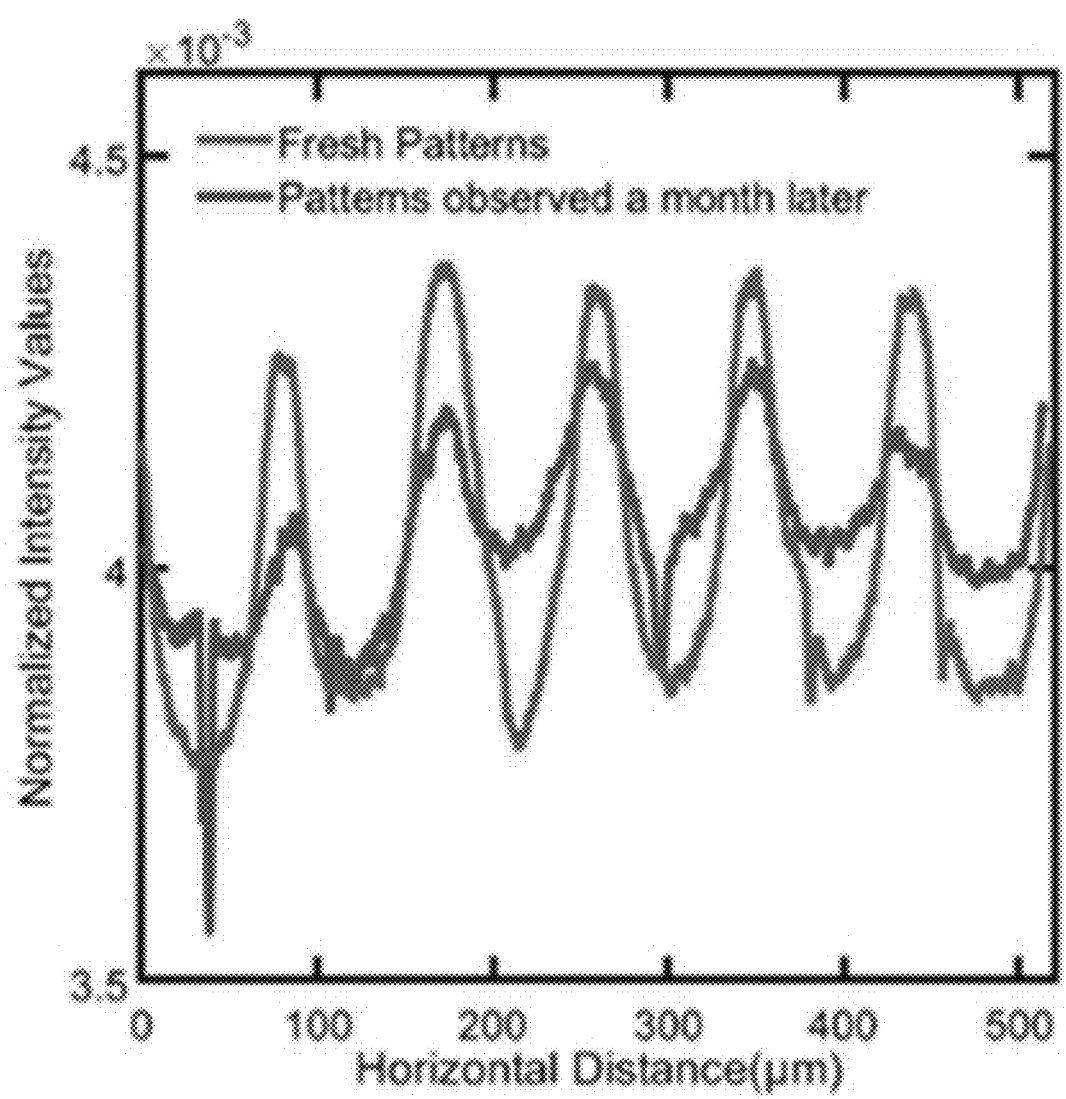

PDMS oligomers that infiltrate into NP packings in LeCaRI are low molecular weight species and are therefore mobile. Ambient thermal energy was sufficient to induce diffusion of the oligomer chains, and this motion is expected to occur even within the NP packing after LeCaRI at room temperature. The mobility of these oligomers can be directly observed by monitoring freshly prepared circular patterns over a period of one month. As shown in FIG. 4C, the patterns fade over time and the contrast difference between the infiltrated and the originally uninfiltrated regions decreases with time as seen in FIG. 4C which shows the average grayscale intensity of pixels in a rectangular region drawn around the patterns for freshly made samples (red) and samples observed a month later (blue).

The contrast in the intensities of the patterned region seen in the red curve are reduced in the blue curve (FIG. 4C), indicating lateral spreading of the oligomer over time. Patterns that spread out and fade away over time offer applications in, e.g., making self-destructive patterns with coded messages that can vanish away with time. Another application is in the manufacture of patterned surfaces with a graded wetting properties which has been previously been realized by using topographic features on surfaces. LeCaRI enables room-temperature and solvent-free fabrication of patterned regions with a gradient in wetting without using any tedious or costly micro-patterning techniques.

Although spreading of infiltrated oligomers can provide advantages for some applications, it could also be desirable to permanently fix the freshly prepared or laterally graded patterns for other applications. To demonstrate that patterns can be permanently localized, one can use, e.g., a variant of commercial PDMS that can be crosslinked under ultraviolet (UV) irradiation. This UV-crosslinkable PDMS (UV-PDMS) is incorporated into the PDMS elastomer by simply adding it to the precursor prior to thermal curing. UV-PDMS is subsequently induced to undergo LeCaRI, leaching out of the PDMS elastomer and into the voids in a 27 nm-SiO$_2$ NP film with a thickness of 250 nm.

Figure 4D:
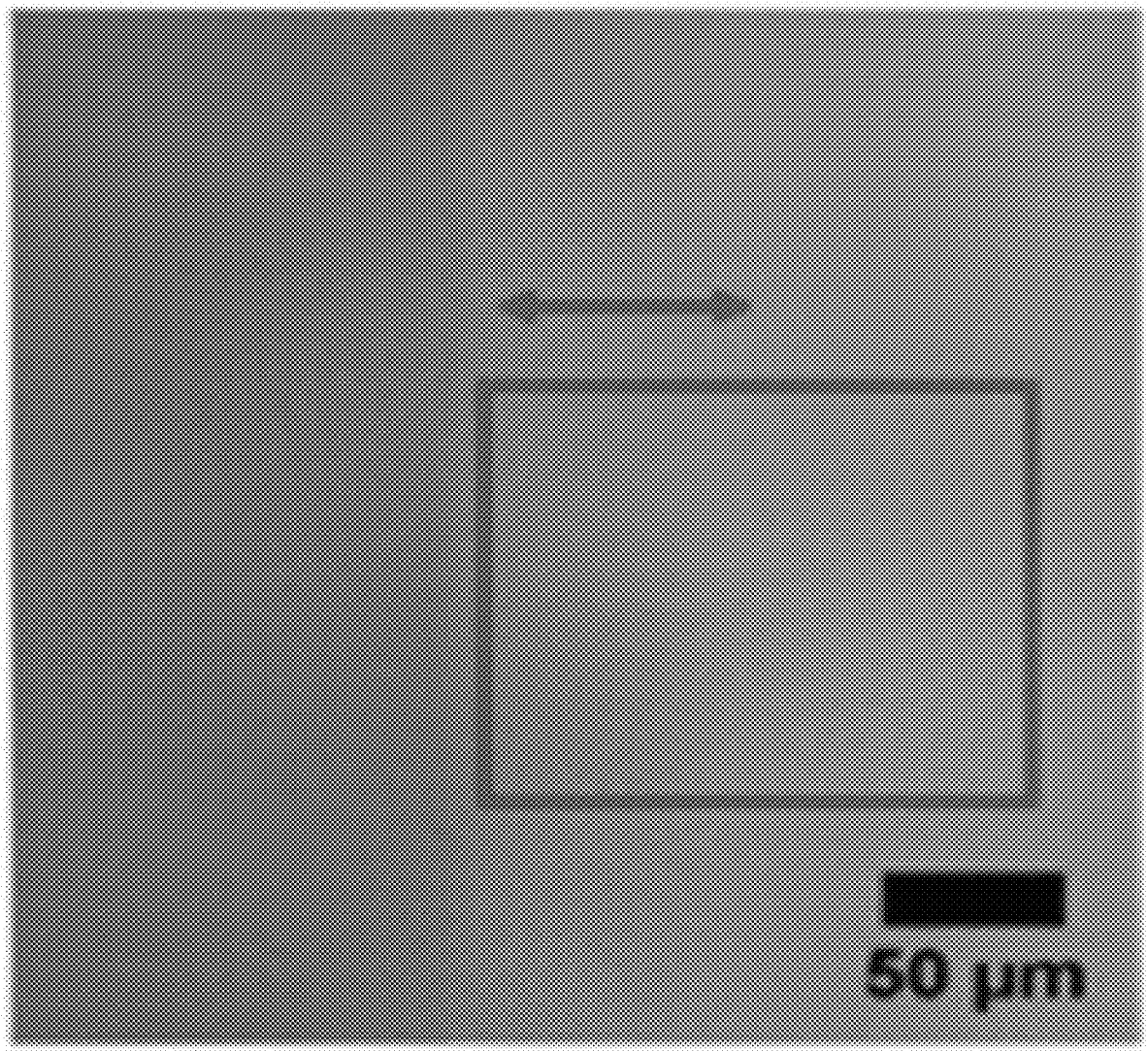
Figure 4E:
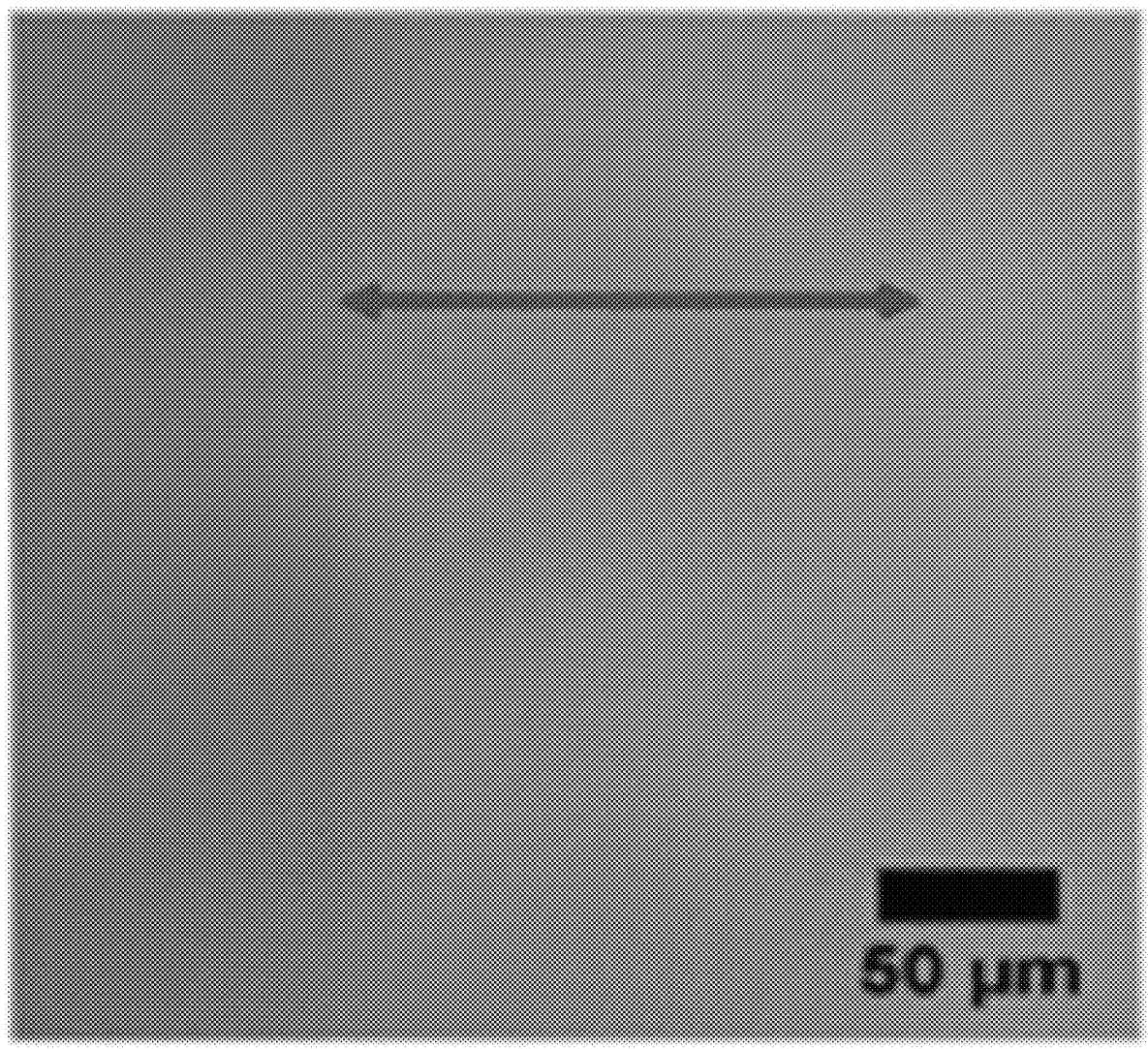
Figure 4F:
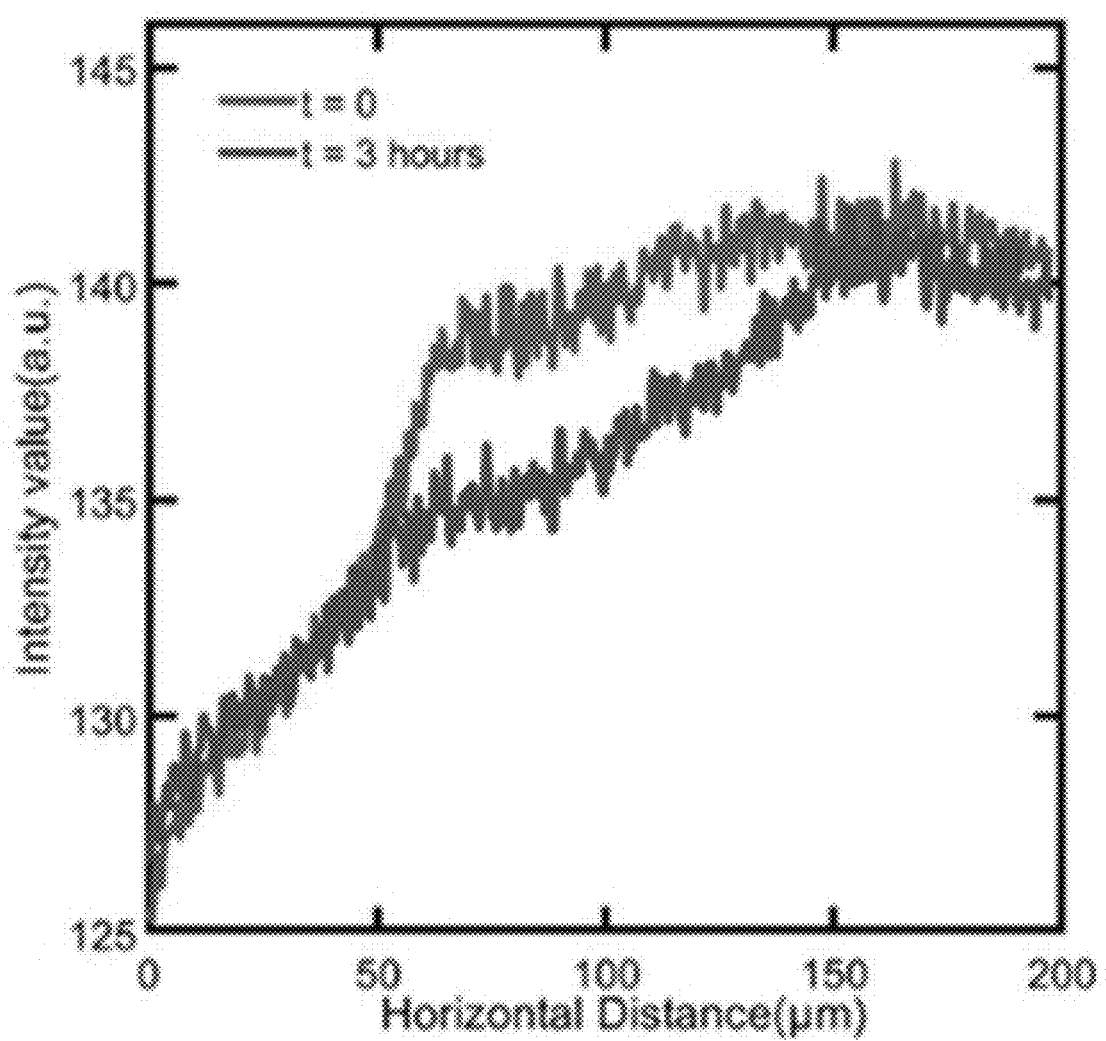

When patterning is performed using UV-PDMS, a region with intermediate light intensity between the infiltrated (purple region) and uninfiltrated (dull yellow) regions is observed close to the edge of the pattern (blue arrow in FIG. 4D). This intermediate region indicates that there is an immediate lateral spreading of the oligomer upon performing LeCaRI. The width of this middle region increases with time as indicated by the red arrow in FIG. 4E as well as the intensity profile in FIG. 4F. The spreading front moved approximately 80 µm in distance in 3 hours.

Figure 4G:
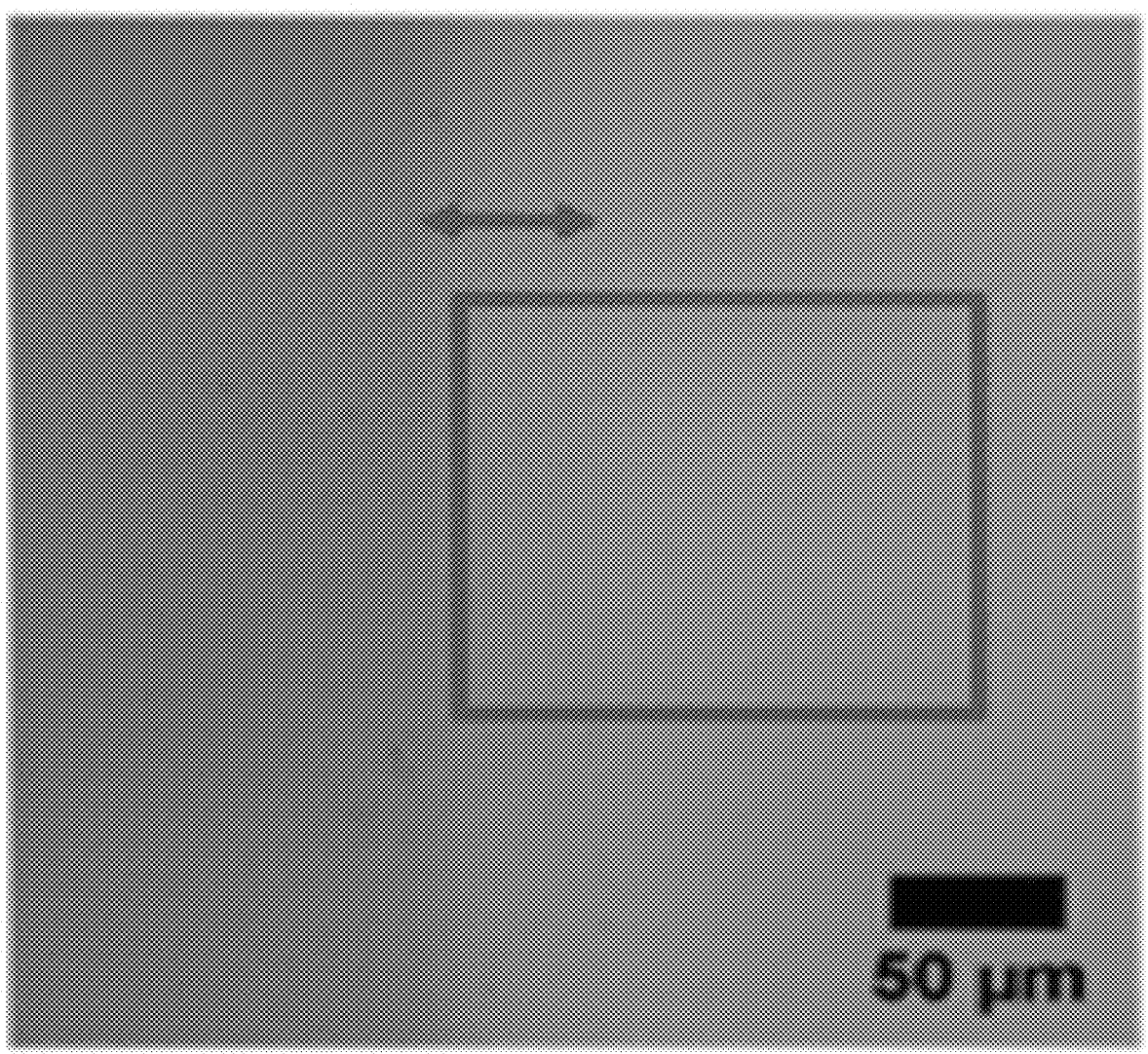
Figure 4H:
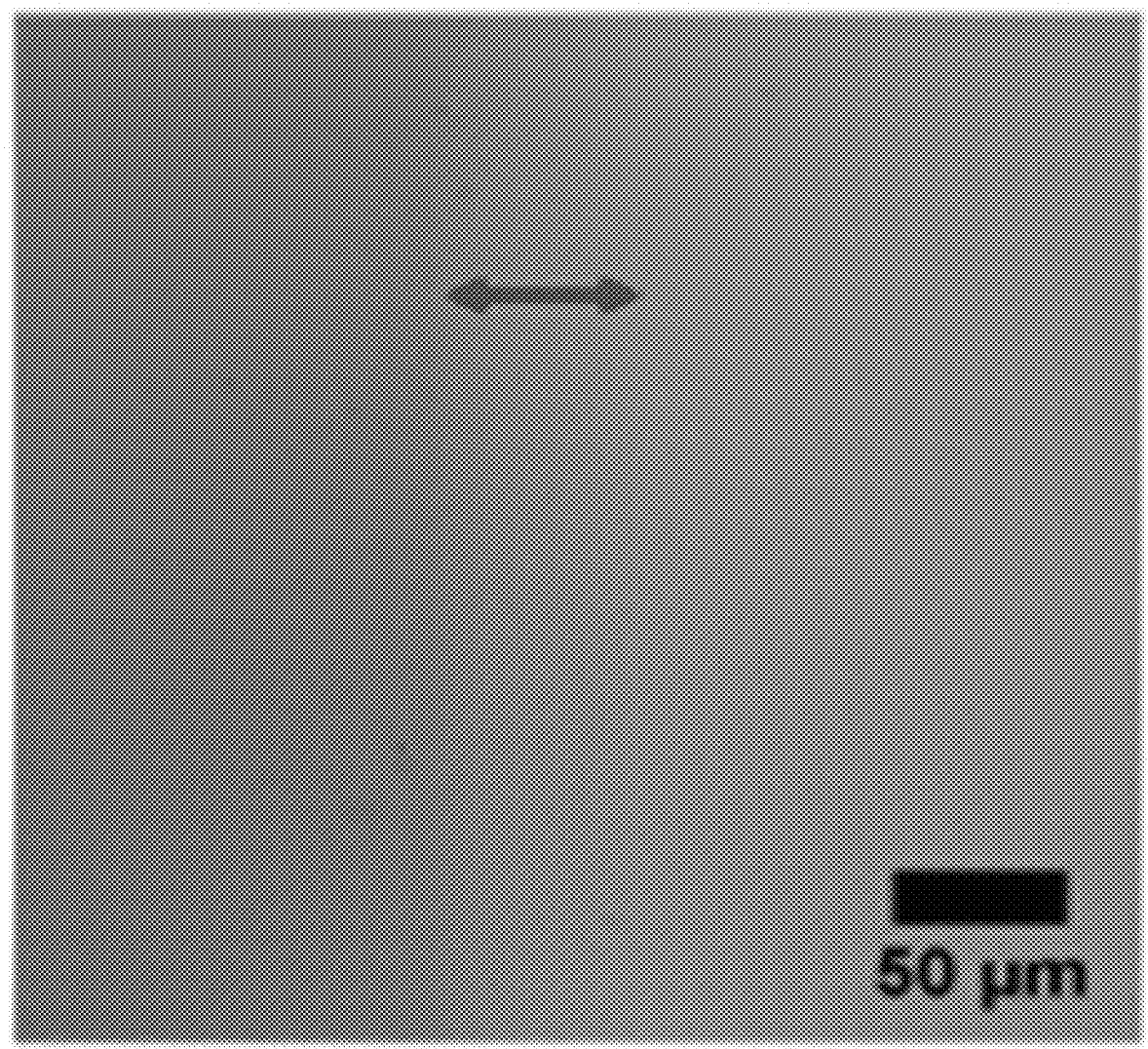
Figure 4I:
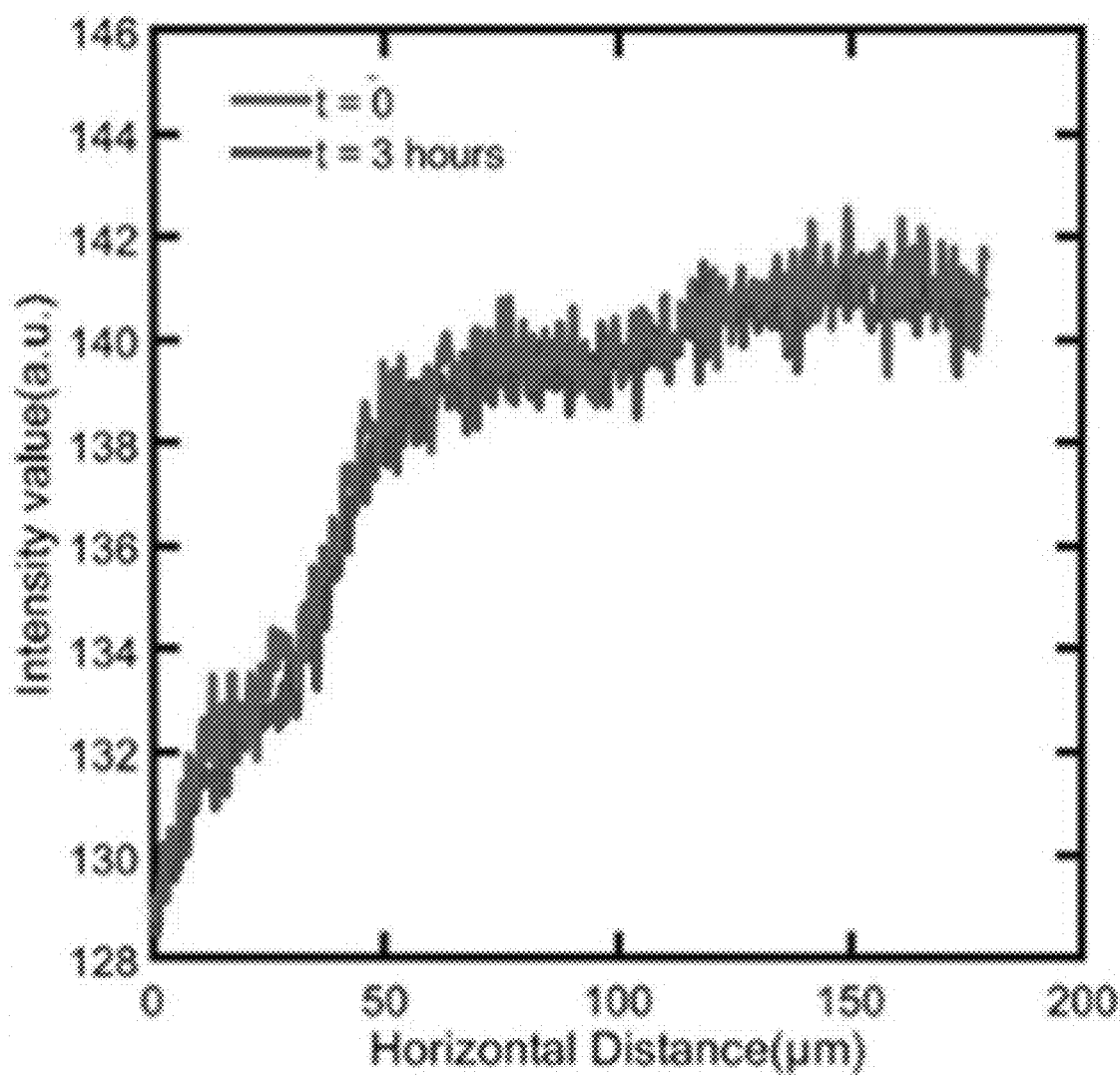

When the patterned LeCaRI film is irradiated with UV upon producing the pattern via LeCaRI, no spreading of this intermediate region is observed as observed in FIGS. 4G-4I, due to the crosslinking of UV-PDMS oligomers inside the NP film; the crosslinked UV-PDMS loses the mobility to undergo spreading. Thus, the patterns can be permanently locked or "frozen" into regions where LeCaRI has taken place. In addition, LeCaRI enables the removal of un-infiltrated NP packings, so as to in turn produce patterns of highly filled composite materials on the surface.

Experimental Procedures

PDMS elastomer was made by mixing Sylgard™ 184 base and the curing agent in a 10:1 ratio and pouring the mixture onto a cut and cleaned silicon wafer in a Petri dish. The mixture was then cured by baking at 80° C. for 2 hours on a hot plate. Once cured, the PDMS was peeled from the wafer and then cut into 1 cm×1 cm pieces.

A 30 wt % colloidal dispersion of 27 nm LUDOX® TM-50 silica nanoparticles (SiO$_2$ NP) is obtained from Sigma Aldrich. A 15 wt % dispersion was prepared by diluting with de-ionized water and the dispersion is sonicated for 5-6 hours. 1 cm×1 cm silicon wafer pieces cleaned with isopropanol, acetone, and water and then plasma cleaned for 4-5 minutes.

The NP suspension was then spin coated on the silicon wafer substrate using a Laurell Technologies Co., WS-400BZ-6NPP/Lite spin coater with the spin conditions set at 2000-2500 rpm for 1.5 minutes. The thickness and refractive index of the NP packings are measured using an Alpha-SE spectroscopic ellipsometer from J. A. Wollam using a wavelength range of 370-900 nm. The source incidence and detection angles were set at 700 relative to normal incidence.

A simple Cauchy model was used to fit the ellipsometry data to calculate the film properties. The Cauchy model describes the dependence of refractive index on wavelength as:

$$n = A + \frac{B}{\lambda^2} + \frac{C}{\lambda^4}$$

where A, B and C are parameters that are used to fit the data to the model. Additional parameters like k-value, exponent, and angle offset are used to improve the quality of fit.

By describing the film composition using a simple volume-mixing argument, one can deduce the amount of oligomers in the packing. The estimation of the volume fraction of oligomers in a NP film was performed by expressing the refractive index as a simple sum of the product of refractive indices of the constituents of the film and respective volume fractions of the components. For the neat NP film, one has:

$$n_0 = 1.475\varphi_{NP} + 1.33\varphi_{Water} + (1-\varphi_{NP}-\varphi_{Water}) \quad (1)$$

where $\varphi_{NP}$ is the volume fraction of NP in the packing and $\varphi_{Water}$ is the volume fraction of capillary condensed water in the packing.

For the same film after LeCaRI, one has:

$$n_1 = 1.475\varphi_{NP} + 1.33\varphi_{Water} + (1-\varphi_{NP}-\varphi_{Water}-\varphi_{PDMS}) + 1.430\varphi_{PDMS} \quad (2)$$

where $\varphi_{PDMS}$ is the volume fraction of PDMS oligomers in the packing. By subtracting (1) and (2), we get the volume fraction of oligomers as:

$$\phi = \frac{n_1 - n_0}{n_{PDMS} - 1} = \frac{n_1 - n_0}{1.432 - 1} \quad (3)$$

The maximum void fraction in the packing is given as:

$$\theta = 1 - \frac{n_0 - n_{air}}{n_{SiO_2} - 1} = 1 - \frac{n_0 - 1}{1.475 - 1} \quad (4)$$

The values of refractive indices of SiO$_2$, air, and PDMS are obtained from references as 1.475, 1, and 1.432, respectively SEM images of the top-down and cross-section of the samples are taken using a JEOL 7500F HRSEM. The sample is sputtered with a 4 nm iridium layer using a Quorom plasma generating sputter coater prior to imaging to prevent charging. Cross-section images are taken by cleaving the sample using a diamond scribe and mounting the sample vertically on a stub with the cross sections facing the beam. An accelerating voltage of 5 kV, emission current 20 µA, at a working distance of −8 mm is used to image the samples.

Design of Humidity Chamber

A humidity chamber was constructed by enclosing a Boneco Air-O-Swiss® Ultrasonic Digital Humidifier in a tight chamber. The front wall of the chamber is designed with two inlets for access. A digital humidity sensor Fisherbrand™ Traceable™ Jumbo Thermo-Humidity Meter was used to monitor and measure the humidity inside the chamber.

Commercial $SiO_2$ suspensions of LUDOX® SM-30(7 nm diameter), LUDOX® TM-50(27 nm diameter) were obtained from Sigma Aldrich, and SNOWTEX® ST-YL(61 nm diameter) and SNOWTEX® ST-ZL(77 nm diameter) $SiO_2$ were obtained from Nissan Chemical America Corp. $SiO_2$ NP films of thickness 250-300 nm are made using spin coating as explained above. The thickness and refractive indices of the films were measured using ellipsometry. The Cauchy model with additional parameters-k-value and exponent, angle offset—was used to fit the data.

The films were exposed to humidity levels of 0%, 20-25% relative humidity (RH) under ambient conditions, and 40-45% RH and 55-60% RH in the humidity-controlled chamber. The films were allowed to come to equilibrium with the surroundings by waiting for 5 minutes before proceeding further with LeCaRI. PDMS gels were brought into conformal contact with the NP films and left in contact for 15-20 seconds. The PDMS elastomer was then peeled off and the refractive indices of the films are measured using ellipsometry. The refractive index before and after the infiltration was compared to determine the amount of oligomers in the packing.

Determination of the amount of capillary-condensed water

The amount of water condensed in the NP films varies with the size of the NP and the humidity level. At room temperature and humidity, one can measure the refractive index of NP film. This film is then mounted on a heat stage Linkam THMS350V and ramped up to 150° C. at a heating rate of 30° C./min. The temperature was held at 150° C. for one hour while the ellipsometric measurement of the film is performed. By comparing the refractive index of the NP film after heating ($n_{RH}=0$ at 0% humidity) to before heating ($n_{RH}=22$ at RH of 22%), we can determine the amount of capillary condensed water using:

$$\theta(\text{at } RH = 22) = \frac{n_{RH=22} - n_{RH=0}}{n_{water} - 1} = \frac{n_{RH=22} - n_{RH=0}}{1.33 - 1} \quad (5)$$

By repeating the same for relative humidity value of 38%, one can estimate the amount of water condensed in the NP film at RH 38%. The void volume available for infiltration (#) can be calculated using:

$$\phi((\text{at } RH=22)=\phi(\text{at } RH=0)-\theta(\text{at } RH=22) \quad (6)$$

Figure 6:
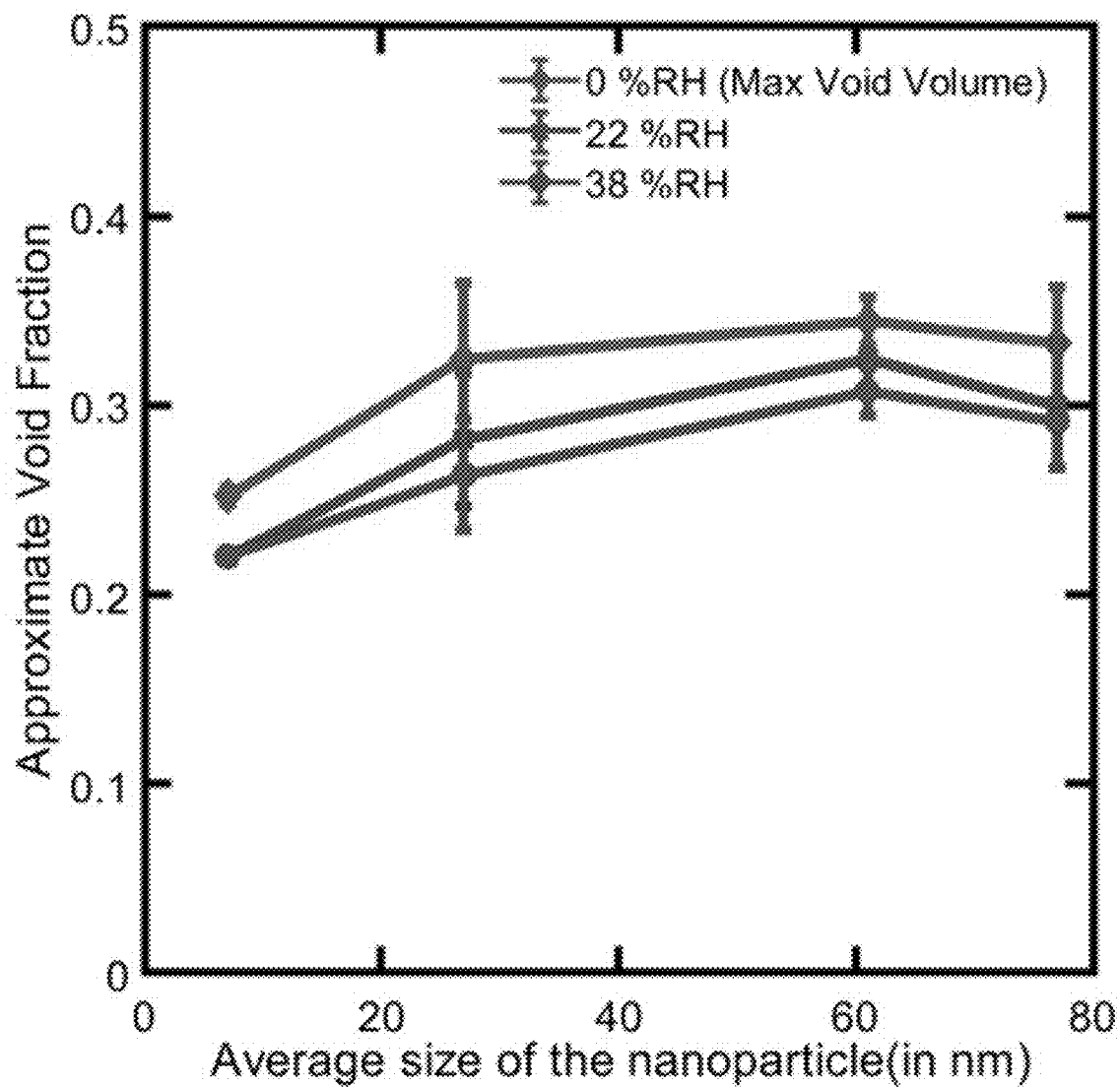
FIG. 6: Approximate void fraction inside an example NP packing at different humidity levels for particles of different sizes.

These findings were also complemented by annealing a bilayer of Polystyrene-173K film atop $SiO_2$ NP packings for all the four sizes. Complete infiltration of polymers into the pores of the packings gives another way to estimate the maximum void fraction inside the packing. The results are shown in FIG. 6.

Kinetics of LeCaRI

Figure 7:
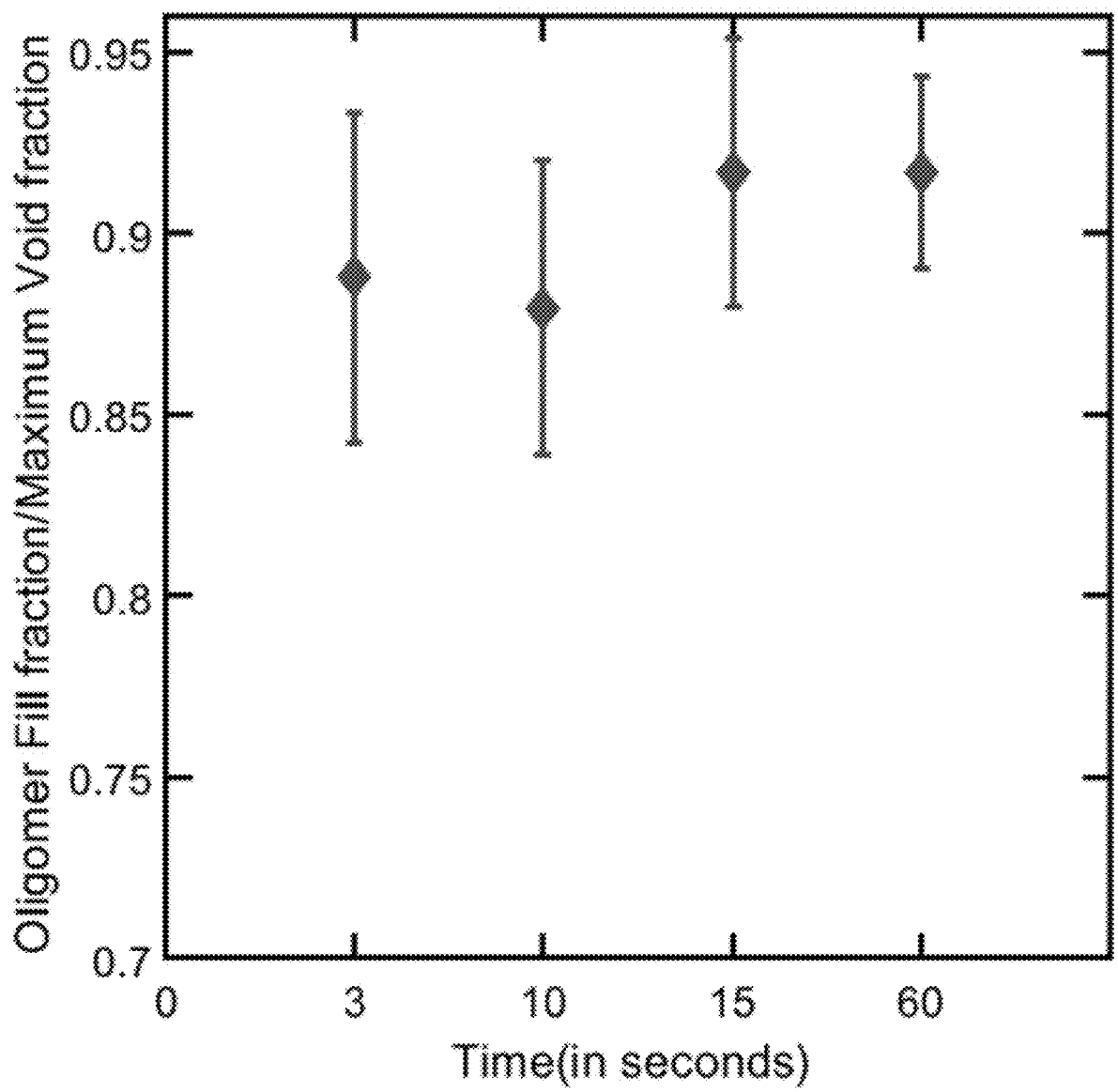
FIG. 7: Amount of oligomer in an example NP packing versus the duration of LeCaRI.

The kinetics of the infiltration of oligomer chains into the NP voids can be measured by maintaining contact between PDMS and NP films for different time periods on several different samples. The change in refractive index, measured using ellipsometry, was analyzed as explained above. The results are summarized in FIG. 7. Negligible changes were observed after 5 sec, indicating that the infiltration of oligomers is completed within the first 5 seconds of LeCaRI.

The time required for the oligomers to infiltrate the packing can be estimated by assuming that LeCaRI follows the Lucas-Washburn model.

$$h^2 = \frac{\sigma R \cos\theta}{2\tau^2 \mu} t \quad (7)$$

The viscosity of the base is specified as 4000 mPa·s after mixing at 23° C. The average radius of the pore is 30% of the radius of the particle close-packed in the NP film. For TM50, this is R=0.3×13.5=4.05 nm. PDMS has a surface tension value of 20 mN/m. The tortuosity of the packing is determined to be 1.95. Assuming the wetting behavior of PDMS on silica to be such that $\cos(\theta)\approx 1$, the time required for the oligomers to infiltrate the film thickness h=250 nm can be calculated as:

$$t = \frac{2h^2 \mu \tau^2}{\sigma R \cos\theta} = 0.0235 \text{ seconds} \ll 1 \text{ second.}$$

Patterning of PDMS Surfaces and Patterns Observed Using Microscope

Photomasks for patterning PDMS were designed using AutoCAD 2018 and printed out from CAD/Art Service, Inc. (CA, USA). A positively embossed master mold is fabricated on a 3" silicon wafer using the conventional soft lithography technique in a cleanroom of the Quattrone Nanofabrication Center of the Singh Center of Nanotechnology at the University of Pennsylvania.

Positive photoresist KMPR-1050 (MicroChem, MA, USA) is used and 100 micron thickness mold is fabricated with corresponding spin coat speed and UV exposure time. The master mold is subsequently silanized with Trichloro (1H,1H,2H,2H-perfluorooctyl)silane, PFOTS, to facilitate PDMS mold peel-off.

Polydimethylsiloxane (PDMS) precursor is prepared and cured as explained before. Once completely cured, the negatively embossed PDMS master is peeled off and surface-modified with oxygen plasma treatment, then left in vacuum with PFOTS for 2 hours. Another batch of degassed PDMS is then poured on PFOTS-coated PDMS master and cured for 4 hours at 65° C. The upper PDMS slab with positively embossed features is peeled off and used as a stamp for patterning via LeCaRI. The NP films after LeCaRI using patterned PDMS are observed under an upright optical microscope in the reflection mode. The intensity of the images taken right after patterning are compared to the intensity of the image a month later to determine the loss in intensity of the pattern. This was done by calculating the local intensity in a rectangular region drawn on the image using ImageJ software's plot profile functionality. The intensity curves are normalized by dividing the intensity value at each point by the total intensity of pixels in the rectangle.

UV crosslinkable PDMS (UV-PDMS)

UV-PDMS KER-4690 is obtained from Shin-Etsu, which comes as two components: Part A and Part B. Visible light can trigger the cross-linking catalyst once the two components are mixed, thus exposure to light is avoided as much as possible in all stages of the process. Part A and Part B were mixed in a 1:1 weight ratio in a plastic container wrapped with aluminum foil such that the total amount is 10 grams.

Subsequently, Sylgard 184 base and precursor were added to the plastic container in 10:1 ratio such that the total amount added is 5 g. The weight ratios of UV-PDMS to PDMS are thus maintained at 2:1. The mixture is then degassed in a vacuum chamber for 30 minutes. The mixture is then poured onto a clean, cut silicon wafer in a petri dish and baked for 2 hours at 80° C. on a hot plate in a dark room. The cured PDMS gels were then cut into 1 cm×1 cm square pieces and stored in a petri dish wrapped in aluminum foil until needed further.

The UV-PDMS+PDMS elastomer was brought into contact with a $SiO_2$ NP packing made from™-50 $SiO_2NP$ (27 nm) such that one half of the top area of the film is patterned by LeCaRI. The front between the patterned and the unpatterned region was monitored by using an upright optical microscope in bright-field mode.

ThorCam™ software was used for video acquisition by taking 1 frame every 2 minutes. The same is repeated for a region patterned using PDMS and a region patterned using UV-PDMS+PDMS. The latter is cured in a UV-ozone chamber for 20 minutes by exposure to UV (185 nm & 254 nm wavelength).

Discussion

Provided is a powerful and rapid method to induce infiltration of oligomeric species from PDMS elastomer into NP films, which can be used to pattern PINFs. The process can be completed in a matter of seconds at room temperature, without the need for solvents. Because of the simplicity and rapidity of the process, one can scale the disclosed methods to enable manufacturing of patterned PINFs.

Figure 8:
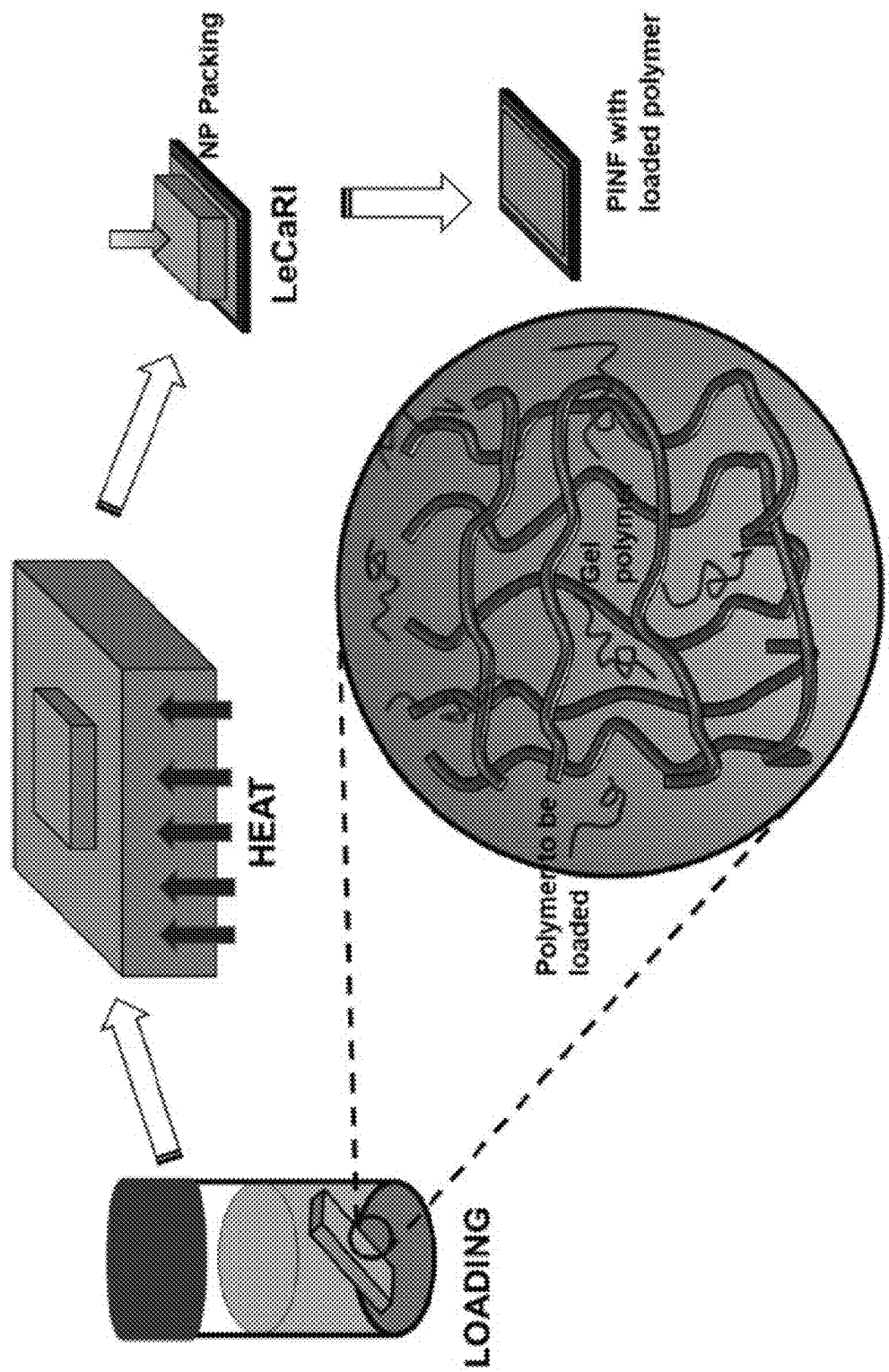
FIG. 8: An exemplary overview of a disclosed process for loading (or reloading) a gel (such as a PDMS gel) with polymer for further delivery of the polymer to a bed of nanoparticles.

FIG. 8 provides an overview of an exemplary process for loading (or reloading) a gel with polymer so that the gel can be used to deliver the polymer to a bed of nanoparticles. As shown in FIG. 8, in a loading step, a polymer gel can be contacted with a polymer solution, e.g., via immersion, such that polymer chains of the solution enter into the gel, e.g., via infiltration. It should be understood that the polymer of the polymer gel (e.g., PDMS) need not be the same as the polymer of the polymer solution. As described elsewhere herein, polybutadiene can be used in the polymer solution and PDMS can be used as the polymer gel. At the same time, the polymer of the polymer solution can be the same as the polymer of the polymer gel.

Following the contacting of the gel with the polymer solution, the polymer-loaded gel can be heated, e.g., to drive off excess solvent (e.g., toluene or other solvent) from the polymer solution. In this way, during the infiltration process, only the loaded polymer is transferred from the gel into the nanoparticle bed. Heating can be performed at a temperature (e.g., 80 degrees) for a period of time (e.g., 4, 5, or 6 hours) sufficient to drive off sufficient solvent. (For a less volatile solvent, a higher heating temperature can be used.) The heating can also be followed by drying and/or vacuum so as to further remove solvent and otherwise condition the polymer-loaded polymer gel.

As shown in FIG. 8, the polymer-loaded polymer gel (following solvent removal) can be contacted to a bed of nanoparticles ("NP packing") under such conditions that the free polymer chains of the polymer-loaded gel infiltrate into the nanoparticles, thereby giving rise to a PINF structure.

As shown, the disclosed methods thus do not need to depend only on the native, uncrosslinked chains of the polymer (e.g., PDMS) that makes up the polymer gel (also termed "polymer source"). As shown, by depleting the gels and loading them with new polymers, one can expand the applicability of LeCaRI, as multiple rounds of depleting and loading can produce new PINFs with differing polymer blends inside nanoparticle packings.

With this approach, one can infiltrate two or more polymers into a single bed of nanoparticles, which multiple polymers can themselves have different properties, providing additional functionalities. The different polymers can be infiltrated simultaneously (e.g., from the same polymer source), but can also be infiltrated sequentially. As but one example, one can use P3HT(Poly(3-hexylthiophene-2,5-diyl)), an electrically conductive polymer, along with polystyrene a glassy polymer which can provide mechanical toughness, and/or polybutadiene which can provide stretchability allowing the manufacturing of rigid or flexible electrical devices. In this way, one can infiltrate one type of polymer or even a plurality of types of polymers into a given bed of nanoparticles, thereby allowing one to tune the property enhancement and emergent functionality. As another example, one can load two different kinds of polyelectrolyte into a bed of nanoparticles, one after the other, with the subsequent infiltration into the nanoparticles giving rise to coacervates under confinement.

One can contact the bed of nanoparticles with a first plurality of free polymer chains (that infiltrate into the bed of nanoparticles) and also with a second plurality of free polymer chains that comprises polymer chains that differ in molecular weight, molecular formula, or any combination thereof from the polymer chains of the first plurality of free polymer chains. This contacting can be done by, e.g., a single gel that has loaded therein both the first plurality of free polymer chains and the second plurality of free polymer chains. The contacting can also be performed by two gels, one of which having loaded therein the first plurality of free polymer chains and the other of which having loaded therein the second plurality of free polymer chains. The contacting can also be performed sequentially by the same gel such that the gel is first loaded with the first plurality of free polymer chains, the gel is contacted to the bed of nanoparticles, the depleted gel is then reloaded with the second plurality of free polymer chains, and then the reloaded gel is contacted to the bed of nanoparticles so as to infiltrate the second plurality of free polymer chains into the bed of nanoparticles. The methods can be performed such that a first region of the nanoparticle bed is infiltrated by the first plurality of free polymer chains and a second region of the nanoparticle bed is infiltrated by the second plurality of free polymer chains. In this way, different regions of the nanoparticle bed can have different polymer chains infiltrated therein, which can be useful to, e.g., confer different properties on different parts of the nanoparticle bed.

As seen, one can use essentially any elastomeric gels to load and infiltrate new polymers, as the gel can be understood as acting as a reservoir of polymers in this method. As but some examples, one can use as gels urethane-based elastomers, hydrogels, and the like, and also use essentially any polymer (e.g., any low or high Tg polymer) as the polymer that is loaded into the gel. If the polymer is mobile at room temperature inside the gel, one can use LeCaRI to transfer the polymer into the NP packing. If the polymer is not mobile (e.g., glassy or semi-crystalline) at room temperature, one can heat the gel placed in contact with the NP packing at a target temperature (e.g., the polymer's glass transition temperature or the melting point) so as to induce mobility to the loaded polymers such that the loaded polymer (or polymers) infiltrate into the NP packings. In this way, essentially any polymer can be loaded from a solution into a gel (e.g., elastomer) and then transferred to a nanoparticle packing either at room temperature and/or with thermal annealing.

As shown, LeCaRI films have high fill fractions of NPs, and the extent of oligomer infiltration can be controlled by varying the humidity of the surroundings and the NP size. The patterns of PINFs prepared using PDMS spread over time giving lateral gradients in compositions. The patterns can also be locked in permanently by inducing crosslinking of infiltrated oligomers, which can be demonstrated using light-activated crosslinking. The example incorporation and subsequent infiltration of UV-PDMS shows that LeCaRI can be used with other species that can be incorporated in PDMS or with other types of elastomeric network (e.g., polyurethane), making LeCaRI a general method of patterning PINFs, such as PINFs with low glass transition temperature polymers.

Aspects

The following Aspects are illustrative only and do not serve to limit the scope of the present disclosure or the attached claims.

Aspect 1. A method, comprising: contacting a bed of nanoparticles and a surface of a polymer source, the polymer source comprising a plurality of free polymer chains, the contacting being performed under conditions such that at least some of the plurality of free polymer chains infiltrate by capillary action into interstitial spaces within the bed of nanoparticles.

Exemplary nanoparticles include, e.g., oxide nanoparticles, such as including alumina, titania, silica, iron oxide, and the like. Metal nanoparticles (e.g., gold nanoparticles, silver nanoparticles) are also suitable. Semiconducting nanoparticles (including quantum dots) are also suitable. Polymeric nanoparticles can also be used.

The bed of nanoparticles can be in a packed form. The bed of nanoparticles can also be present as a cohesive structure, e.g., a structure wherein individual nanoparticles are maintained in place, e.g., via nanoparticle-nanoparticle interactions or other forces. A packed bed or slab of nanoparticles is one such example.

Nanoparticles can have a diameter of, e.g., from about 1 to about 1000 nm (and all intermediate values and intermediate ranges), e.g., from about 10 to about 950, or from about 50 to about 900, or from about 100 to about 850, or from about 200 to about 800, or from about 250 to about 750, or from about 300 to about 700, or from about 350 to about 650, or from about 400 to about 600, or even from about 45 to about 550 nm.

A polymer source can be, e.g., a slab of polymer. A polymer source can comprise solid or fluid. As described elsewhere herein, a polymer source can be an amount of polymerized PDMS that includes some free polymer chains.

Aspect 2. The method of Aspect 1, wherein the polymer source comprises an elastomer.

Aspect 3. The method of any one of Aspects 1-2, wherein the polymer source comprises a plurality of crosslinked polymer chains.

Aspect 4. The method of any one of Aspects 1-3, wherein the contacting is performed so as to effect at least partial infiltration of the free polymer chains into the interstitial spaces within the bed of nanoparticles, the contacting optionally being performed to effect complete infiltration by the free polymer chains into the interstitial spaces within the bed of nanoparticles.

As an example, the contacting can be performed for a time sufficient to allow for complete infiltration of the free polymer chains into the interstitial spaces between the nanoparticles, i.e., until no further uptake of free polymer chains occurs. Contacting can also be performed for less than a time sufficient to allow for complete infiltration of the free polymer chains into the interstitial spaces between the nanoparticles.

Aspect 5. The method of any one of Aspects 1-4, wherein the bed of nanoparticles is characterized as a slab. A slab of nanoparticles can be characterized as a film. The bed of nanoparticles can be present as a cohesive structure, e.g., a structure wherein individual nanoparticles are maintained in place, e.g., via nanoparticle-nanoparticle interactions or other forces. A packed bed or slab of nanoparticles is one such example.

Aspect 6. The method of any one of Aspects 1-5, wherein the bed of nanoparticles is disposed on a substrate. A substrate can be, e.g., glass, silicon, plastic, and the like. A substrate can be transparent, but this is not a requirement.

Aspect 7. The method of any one of Aspects 1-6, wherein the surface of the polymer source defines a pattern. As one example, a polymer source can comprise one or more ridges, mesas, bumps, zig-zags, or other regions of relatively higher elevation compared to other regions of the polymer source. One such example is shown in FIG. 3A, which shows a positively embossed PDMS polymer source that features several raised mesas, which mesas in turn "print" polymer onto the bed of packed nanoparticles.

Aspect 8. The method of Aspect 7, wherein the surface of the polymer source defines a raised portion, a recessed portion, or both.

Aspect 9. The method of Aspect 8, wherein the nanoparticles of the bed of nanoparticles are disposed according to a pattern. As shown in, e.g., FIG. 3A, the bed of nanoparticles can be disposed as a film or a slab that is unpatterned. The nanoparticles can, however, be disposed in a pattern, e.g., stripes, spots, polygons, and the like.

Aspect 10. The method of any one of Aspects 1-9, wherein the contacting gives rise to a composite polymer-infiltrated nanoparticle film that comprises at least about 40 vol % nanoparticles.

Aspect 11. The method of Aspect 10, wherein the contacting gives rise to a polymer-infiltrated nanoparticle film that comprises at least about 50 vol % nanoparticles.

Aspect 12. The method of any one of Aspects 1-11, wherein the contacting gives rise to a polymer-infiltrated nanoparticle film that comprises from about 50 vol % to about 99 vol % nanoparticles.

Aspect 13. The method of any one of Aspects 1-12, wherein the contacting gives rise to a plurality of regions of polymer-infiltrated nanoparticle film that are not contiguous with one another. As one example, contacting a packed bed of nanoparticles with a polymer source having two mesas spaced at a distance from one another can give rise to two regions of polymer infiltration within the packed bed of nanoparticles, with the two regions being spaced (i.e., being non-contiguous) with one another.

Aspect 14. The method of any one of Aspects 1-13, wherein the contacting gives rise to a plurality of regions of polymer-infiltrated nanoparticle film that are contiguous with one another. This can be accomplished by, e.g., a contacting a packed bed of nanoparticles with a polymer source having a surface pattern of linked hexagons, which can in turn give rise to contiguous hexagonal regions of polymer infiltration within the packed bed of nanoparticles.

Aspect 15. The method of any one of Aspects 1-14, further comprising crosslinking free polymer chains that infiltrate by capillary action into interstitial spaces within the bed of nanoparticles.

Aspect 16. The method of Aspect 15, wherein the crosslinking is effected by illumination (e.g., ultraviolet illumination), heat, a chemical agent, or any combination thereof. Free polymer chains can, of course, be selected on the basis of their susceptibility to crosslinking by an external stimulus.

Aspect 17. The method of any one of Aspects 1-16, wherein the bed of nanoparticles defines a thickness extending in a first direction.

Aspect 18. The method of Aspect 17, wherein the thickness is in the range of from about 10 nm to about 5000 micrometers.

Aspect 19. The method of any one of Aspects 17-18, wherein the contacting gives rise to free polymer chains infiltrating in the first direction. As an example, a bed of nanoparticles can be present in a square film having a thickness (in the z-direction) of 300 nm and a width (i.e., a side of the square) of 1000 nm in the x- and y-directions, which directions are perpendicular to the z-direction. When the nanoparticle film is contacted with a polymer source (e.g., a PDMS stamp), free polymer chains from the polymer source are, via capillary action, infiltrated into the nanoparticle film in the z-direction, i.e., in the direction of the thickness.

Aspect 20. The method of any one of Aspects 17-19, wherein the contracting gives rise to free polymer chains infiltrating in a lateral direction that is essentially perpendicular to the first direction. In the example above, free polymer chains thus spread laterally in a direction (e.g., the x-direction or the y-direction, or in a direction in the x-y plane that is essentially perpendicular to the z-direction). In this way, polymer chains can infiltrate into a bed of nanoparticles, as well as spreading throughout the bed of nanoparticles.

This in turn allows a user to create a polymer concentration gradient in virtually any direction. For example, a user can create a polymer concentration gradient in the thickness of the bed of nanoparticles, e.g., where the concentration (which can be considered a density) of polymer is greatest closest to the surface of the bed of nanoparticles that contacts (or contacted) the polymer source, and decreases in the direction of the thickness of the bed of nanoparticles as one moves in that direction away from the surface of the bed of nanoparticles that contacts (or contacted) the polymer source.

A user can also create a "lateral" polymer concentration gradient in the bed of nanoparticles, e.g., a gradient in a direction perpendicular to the direction of the thickness of the bed of nanoparticles. As an example, the concentration (which can be considered a density) of polymer is greatest closest to the location on the bed of nanoparticles that contacts (or contacted) the polymer source, and decreases as one moves in the lateral direction away from the location of the bed of nanoparticles that contacts (or contacted) the polymer source.

Aspect 21. The method of any one of Aspects 17-20, wherein the contacting gives rise to a polymer concentration gradient along the first direction.

Aspect 22. The method of any one of Aspects 20-21, wherein the contacting gives rise to a polymer concentration gradient along the lateral direction.

Aspect 23. The method of any one of Aspects 1-22, wherein the bed of nanoparticles is contacted to two non-contiguous polymer sources. The two non-contiguous polymer sources can each be loaded with the same polymer or with different polymers. As an example the first polymer source can be loaded with polystyrene, and the second polymer source can be loaded with polybutadiene.

It should be understood that the disclosed technology can include contacting the bed of nanoparticles with a plurality of different polymer sources, each of which polymer sources is loaded with different polymer chains. (Different polymer sources can, however, also be loaded with the same polymer chains, e.g., two polymer sources that are both loaded with free polybutadiene polymer chains.) It should also be understood that the bed of nanoparticles can comprise nanoparticles all formed of the same material, but the bed of nanoparticles can also comprise nanoparticles formed of different materials.

Aspect 24. The method of any one of Aspects 1-23, wherein the contacting is performed such that the free polymer chains fill from 0.05 to 0.95 of the maximum void fraction in the bed of nanoparticles. The contacting can be performed such that the free polymer chains fill from 0.05 to 0.95, from 0.20 to 0.90, from 0.30 to 0.85, or even from 0.40 to 0.80 of the maximum void fraction in the bed of nanoparticles.

Aspect 25. The method of any one of Aspects 1-24, further comprising curing free polymer chains that infiltrate the bed of nanoparticles.

Aspect 26. The method of Aspect 25, wherein the curing comprises polymerizing, crosslinking, or both. As an example, curing can be effected by ultraviolet radiation.

Aspect 27. The method of any one of Aspects 25-26, wherein the curing is performed so as to establish a boundary of cured polymer, which boundary retards movement of free polymer chains infiltrating the bed of nanoparticles. As an example, one can cure a circular region of free polymer chains that have infiltrated into the bed of nanoparticles. This in turn leaves a circular (or disc)-shaped region of cured polymer, and the remaining non-cured free polymer chains can be removed, if desired. In this way, one can form polymer-nanoparticle regions of any shape (e.g., using illumination applied through a mask) within the population of nanoparticles. One such example is shown in FIG. 3D, which shows disc-shaped nanoparticle-polymer regions within a population of nanoparticles. Laterally patterned and graded regions can be engineered to have properties desired by the user, e.g., properties suited for applications in water management, microsensors, photonic and optical applications, among others.

Aspect 28. The method of any one of Aspects 25-27, wherein the curing is performed so as to give rise to a pattern of cured polymer regions.

Aspect 29. The method of any one of Aspects 1-28, further comprising removing one or more regions of the bed of nanoparticles. Nanoparticles (e.g., those that are not incorporated or "frozen" into a region of cured polymer) can be removed by, e.g., ultrasonication, chemical techniques (e.g., reducing the interactions between neighboring nanoparticles using pH), and the like.

Aspect 30. The method of Aspect 29, wherein the one or more regions of the bed of nanoparticles are essentially free of infiltrated free polymer chains or of cured polymer. Such regions can be removed, as described elsewhere herein.

Aspect 31. The method of any one of Aspects 1-30, further comprising reloading the first polymer source with a second plurality of free polymer chains.

Aspect 32. The method of Aspect 31, wherein the second plurality of free polymer chains comprises polymer chains that differ in molecular weight, molecular formula, or any combination thereof from the polymer chains of the first plurality of free polymer chains.

Aspect 33. The method of Aspect 32, further comprising contacting the bed of nanoparticles with the reloaded first polymer source. In this way, a single polymer source (e.g., a single elastomer) can be re-used so as to infiltrate polymer (of the same or different types) into the same bed of nanoparticles and/or into different beds of nanoparticles.

In this way, one can perform a continuous production process in which one (or more polymer sources) are loaded with polymer chains, depleted (via movement of the polymer chains from the polymer source into the bed of nanoparticles), and then re-loaded with polymer chains to begin the process anew.

Aspect 34. A polymer-infiltrated nanoparticle film, comprising: a bed of nanoparticles; and a polymer infiltrated into interstitial spaces within the bed of nanoparticles, the polymer-infiltrated nanoparticle film comprising from about 50 vol % to about 99 vol % nanoparticles.

Aspect 35. The polymer-infiltrated nanoparticle film of Aspect 34, wherein the polymer-infiltrated nanoparticle film defines a thickness extending in a first direction.

Aspect 36. The polymer-infiltrated nanoparticle film of Aspect 35, wherein the polymer-infiltrated film defines a polymer concentration gradient through the thickness, measured along the first direction.

Aspect 37. The polymer-infiltrated nanoparticle film of any one of Aspects 34-38, wherein the polymer-infiltrated nanoparticle film defines a polymer concentration gradient in a lateral direction that is essentially perpendicular to the first direction. (The gradient can be measured along the lateral direction.)

Aspect 38. The polymer-infiltrated nanoparticle film of any one of Aspects 34-37, wherein the polymer-infiltrated nanoparticle film defines a plurality of regions that are not contiguous with one another.

Aspect 39. The polymer-infiltrated nanoparticle film of any one of Aspects 34-38, wherein the polymer-infiltrated nanoparticle film defines a plurality of regions that are contiguous with one another.

Aspect 40. The polymer-infiltrated nanoparticle film of any one of Aspects 34-39, further comprising a substrate on which the bed of nanoparticles are disposed.

Suitable substrates are described elsewhere herein, and can include, e.g., flexible materials, transparent materials, opaque materials, translucent materials, rigid materials, and combinations thereof.

Aspect 41. The polymer-infiltrated nanoparticle film of any one of Aspects 34-40, wherein the polymer fills from 0.05 to 0.95 of the maximum void fraction in the bed of nanoparticles.

Aspect 42. The polymer-infiltrated nanoparticle film of any one of Aspects 34-41, wherein the polymer-infiltrated nanoparticle film comprises a region of cured polymer and also comprises a plurality of free polymer chains disposed within the film.

Aspect 43. The polymer-infiltrated nanoparticle film of any one of Aspects 37-42, wherein the polymer-infiltrated nanoparticle film comprises a plurality of polymer species.

Aspect 44. The polymer-infiltrated nanoparticle film of Aspect 43, wherein two of the plurality of polymer species differ in terms of Tg, conductivity, modulus, or any combination thereof.

What is claimed:

1. A method, comprising:
   contacting a bed of nanoparticles and a surface of a first polymer source,
   the first polymer source comprising (i) polymer network and (ii) a first plurality of free polymer chains dispersed in the polymer network,
   the contacting being performed under conditions such that at least some of the first plurality of free polymer chains infiltrate by capillary action into interstitial spaces within the bed of nanoparticles so as to give rise to a composite comprising the nanoparticles and the free polymer chains; and
   separating the composite and the polymer network.

2. The method of claim 1, wherein the first polymer source comprises an elastomer.

3. The method of claim 1, wherein the first polymer source comprises a plurality of crosslinked polymer chains.

4. The method of claim 1, wherein the contacting is performed so as to effect at least partial infiltration of the free polymer chains into the interstitial spaces within the nanoparticles of the bed of nanoparticles, the contacting optionally being performed to effect complete infiltration by the free polymer chains into the interstitial spaces within the bed of nanoparticles.

5. The method of claim 1, wherein the surface of the first polymer source defines a pattern.

6. The method of claim 1, wherein the nanoparticles of the bed of nanoparticles are disposed according to a pattern.

7. The method of claim 1, wherein the contacting gives rise to a composite polymer-infiltrated nanoparticle film that comprises at least about 40 vol % nanoparticles.

8. The method of claim 7, the contacting gives rise to a polymer-infiltrated nanoparticle film that comprises from about 50 vol % to about 99 vol % nanoparticles.

9. The method of claim 1, wherein the contacting gives rise to a plurality of regions of polymer-infiltrated nanoparticle film that are not contiguous with one another.

10. The method of claim 1, further comprising crosslinking free polymer chains that infiltrate by capillary action into interstitial spaces within the bed of nanoparticles.

11. The method of claim 1, wherein the bed of nanoparticles is contacted to two non-contiguous polymer sources.

12. The method of claim 1, wherein the contacting is performed such that the free polymer chains fill from 0.05 to 0.95 of the maximum void fraction in the bed of nanoparticles.

13. The method of claim 1, further comprising curing free polymer chains that infiltrate the bed of nanoparticles.

14. The method of claim 13, wherein the curing is performed so as to establish a boundary of cured polymer, which boundary retards movement of free polymer chains infiltrating the bed of nanoparticles.

15. The method of claim 13, wherein the curing is performed so as to give rise to a pattern of cured polymer regions.

16. The method of claim 1, further comprising reloading the first polymer source with a second plurality of free polymer chains.

17. The method of claim 16, wherein the second plurality of free polymer chains comprises polymer chains that differ in molecular weight, molecular formula, or any combination thereof from the polymer chains of the first plurality of free polymer chains.

18. The method of claim 17, further comprising contacting the bed of nanoparticles with the reloaded first polymer source.

19. The method of claim 1, further comprising contacting the bed of nanoparticles with a second plurality of free polymer chains that comprises polymer chains that differ in molecular weight, molecular formula, or any combination thereof from the polymer chains of the first plurality of free polymer chains.

* * * * *

UNITED STATES PATENT AND TRADEMARK OFFICE
CERTIFICATE OF CORRECTION

| | |
|---|---|
| PATENT NO. | : 12,037,251 B2 |
| APPLICATION NO. | : 17/223546 |
| DATED | : July 16, 2024 |
| INVENTOR(S) | : Daeyeon Lee et al. |

It is certified that error appears in the above-identified patent and that said Letters Patent is hereby corrected as shown below:

On the Title Page

Item (56) In Other Publications:
Under Column no. 1, Page 2, Line no. 45, Replace:
"200-um wavelength"
With:
--200-µm wavelength--

In the Specification

Under Column no. 1, Line no. 11, Replace:
"Infiltration (LeCaR1)" (filed"
With:
--Infiltration (LeCaRI)" (filed--

Under Column no. 4, Line no. 36, Replace:
"a PINE. Patterns"
With:
--a PINF. Patterns--

Under Column no. 8, Line no. 18, Replace:
"at 700 relative"
With:
--at 70° relative--

Under Column no. 8, Line no. 40, Replace:
"$n_0 = 1.475\varphi_{NP} + 1.33\varphi_{Water} + (1 - \varphi_{NP} - \varphi_{Water}$"
With:
--$n_0 = 1.475\varphi_{NP} + 1.33\varphi_{Water} + (1 - \varphi_{NP} - \varphi_{Water})$--

Signed and Sealed this
Third Day of September, 2024

Katherine Kelly Vidal
*Director of the United States Patent and Trademark Office*

CERTIFICATE OF CORRECTION (continued)
U.S. Pat. No. 12,037,251 B2

Under Column no. 8, Line nos. 64-65, Replace:
"1.432, respectively"
With:
--1.432, respectively.--

Under Column no. 9, Line no. 7, Replace:
"of –8 mm"
With:
--of ~8 mm--

Under Column no. 9, Line no. 61, Replace:
"$\phi(at\ RH=22)=\phi(at\ RH=0)-\theta(at\ RH=22)$"
With:
--$\phi(at\ RH = 22) = \phi(at\ RH = 0) - \theta(at\ RH = 22)$--

Under Column no. 11, Line no. 21, Replace:
"made from™-50 SiO$_2$NP (27 nm)"
With:
--made from TM-50 SiO$_2$ NP (27 nm)--

In the Claims

Under Column no. 18, Claim 1, Line no. 5, Replace:
"(i) polymer"
With:
--(i) a polymer--